US011945089B2

(12) United States Patent
Levand et al.

(10) Patent No.: US 11,945,089 B2
(45) **Date of Patent: *Apr. 2, 2024**

(54) PREP TOOL

(71) Applicant: The Sherwin-Williams Company, Cleveland, OH (US)

(72) Inventors: Victor J. Levand, Lyndhurst, OH (US); Sharad Gaurav, Lakewood, OH (US); Sarah Bridget Mulroy, Rocky River, OH (US); Joshua R. Robertson, North Ridgeville, OH (US); Edward Ray Goodwin, Westlake, OH (US); Randi Boss, Avon Lake, OH (US); Michael C. Lambertson, Jr., Aurora, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,198

(22) Filed: May 24, 2022

(65) Prior Publication Data

US 2022/0281093 A1 Sep. 8, 2022

Related U.S. Application Data

(63) Continuation of application No. 16/411,824, filed on May 14, 2019, now Pat. No. 11,370,098, which is a (Continued)

(51) Int. Cl.
*B25F 1/04* (2006.01)
*B08B 1/00* (2006.01)
(Continued)

(52) U.S. Cl.
CPC ................ *B25F 1/04* (2013.01); *B08B 1/005* (2013.01); *B25F 1/006* (2013.01); *B25G 1/08* (2013.01);
(Continued)

(58) Field of Classification Search
CPC .. B25F 1/006; B25G 1/08; B25G 3/14; B25G 3/26; B25G 3/32; B08B 1/005; B26B 11/001; B26B 11/006; B44D 3/006
See application file for complete search history.

(56) References Cited

U.S. PATENT DOCUMENTS 1,552,361 A * 9/1925 Trombley ................. B25F 1/00 7/105
2,092,586 A * 9/1937 Naumovich .............. B25F 1/04 7/105
(Continued)

FOREIGN PATENT DOCUMENTS

CN 1280532 A 1/2001
CN 2468677 Y 1/2002
(Continued)

OTHER PUBLICATIONS

Office Action from corresponding Japanese Application No. 201780021899.7 dated May 27, 2022.

*Primary Examiner* — Hadi Shakeri
(74) *Attorney, Agent, or Firm* — Tucker Ellis LLP

(57) ABSTRACT

A tool is provided that includes unitary plate that includes a blade portion and a tang portion. The blade portion can include an edge. The tang portion can include a positioning hole, a first hole, a slot, a second hole, a rivet hole, and one or more teeth (also referred to as one or more barbs) on a side of the tang portion. The tool can further include a hilt member which includes a through passage, a tab, and a notch. The tool includes an overlay on a body to create a handle for gripping the tool. The tool further includes a hammerhead cap on an end of the body, the hammerhead cap is coupled to the handle with a rivet through the rivet hole.

16 Claims, 19 Drawing Sheets

Related U.S. Application Data continuation of application No. 15/426,129, filed on Feb. 7, 2017, now Pat. No. 10,369,687.

(60) Provisional application No. 62/292,568, filed on Feb. 8, 2016.

(51) Int. Cl.

| | |
|---|---|
| ***B25F 1/00*** | (2006.01) |
| ***B25G 1/08*** | (2006.01) |
| ***B25G 3/14*** | (2006.01) |
| ***B25G 3/26*** | (2006.01) |
| ***B25G 3/32*** | (2006.01) |
| ***B26B 11/00*** | (2006.01) |
| ***B44D 3/00*** | (2006.01) |
| ***E04F 21/165*** | (2006.01) |

(52) U.S. Cl.

CPC ................. *B25G 3/14* (2013.01); *B25G 3/26* (2013.01); *B25G 3/32* (2013.01); *B26B 11/001* (2013.01); *B26B 11/006* (2013.01); *B44D 3/006* (2013.01); *E04F 21/165* (2013.01)

(56) References Cited

U.S. PATENT DOCUMENTS

| | | | |
|---|---|---|---|
| 2,615,247 | A | 10/1952 | Waters |
| 4,620,369 | A | 11/1986 | Gercken |
| 4,746,306 | A | 5/1988 | Yurtin et al. |
| 5,155,913 | A | 10/1992 | Marttiini |
| 5,210,925 | A | 5/1993 | Morgulis |
| 5,251,352 | A | 10/1993 | Cullison |
| 5,528,834 | A | 6/1996 | Seber et al. |
| 5,546,625 | A | 8/1996 | Mealey, Sr. |
| 5,575,030 | A | 11/1996 | Girard |
| 5,615,445 | A | 4/1997 | Kelsay et al. |
| D386,857 | S | 11/1997 | Lawrence |
| D388,671 | S | 1/1998 | Suganami |
| 5,870,786 | A | 2/1999 | Papadopoulos |
| D414,395 | S | 9/1999 | Panfili |
| 5,956,799 | A | 9/1999 | Panaccione et al. |
| 6,006,384 | A | 12/1999 | Toal |
| 6,009,581 | A | 1/2000 | Davis et al. |
| D421,890 | S | 3/2000 | Alexander et al. |
| 6,131,222 | A | 10/2000 | Anderson et al. |
| 6,131,290 | A | 10/2000 | Chiou |
| 6,182,317 | B1 | 2/2001 | Huang |
| D444,692 | S | 7/2001 | Marquardt |
| D446,104 | S | 8/2001 | Chen |
| D446,437 | S | 8/2001 | Chen |
| 6,279,434 | B1 | 8/2001 | Brown |
| D456,236 | S | 4/2002 | Norton |
| D462,251 | S | 9/2002 | Collins et al. |
| D468,617 | S | 1/2003 | Wang |
| D468,989 | S | 1/2003 | Gringer et al. |
| 6,530,098 | B1 | 3/2003 | Gringer et al. |
| D482,588 | S | 11/2003 | Lai |
| D483,244 | S | 12/2003 | Chen |
| 6,668,751 | B1 | 12/2003 | Henke |
| D487,387 | S | 3/2004 | Chen |
| D490,290 | S | 5/2004 | Norton |
| D498,124 | S | 11/2004 | Mitchell |
| D516,394 | S | 3/2006 | Chen |
| D517,896 | S | 3/2006 | Hsu |
| D520,827 | S | 5/2006 | Denton |
| D526,881 | S | 8/2006 | Holby |
| D527,244 | S | 8/2006 | Holby |
| D534,781 | S | 1/2007 | Chen |
| D535,174 | S | 1/2007 | Chen |
| D551,053 | S | 9/2007 | Bruno et al. |
| D565,383 | S | 4/2008 | Bruno et al. |
| D569,215 | S | 5/2008 | Chiu |
| D572,565 | S | 7/2008 | Perez et al. |
| D576,467 | S | 9/2008 | Shu |
| 7,434,318 | B2 | 10/2008 | Perez et al. |
| D581,764 | S | 12/2008 | Kinskey et al. |
| D599,642 | S | 9/2009 | Su |
| 7,587,778 | B2 | 9/2009 | Rosso et al. |
| 7,603,778 | B1 | 10/2009 | Lerch |
| D608,177 | S | 1/2010 | Perlman |
| D609,990 | S | 2/2010 | Delaney |
| D612,702 | S | 3/2010 | Perlman |
| 7,788,760 | B2 | 9/2010 | Schneble |
| 7,818,843 | B2 | 10/2010 | Kinskey et al. |
| 8,205,341 | B2 | 6/2012 | Rosso et al. |
| D674,259 | S | 1/2013 | Metaxatos et al. |
| D674,260 | S | 1/2013 | Metaxatos et al. |
| D693,077 | S | 11/2013 | Thompson |
| 8,635,782 | B2 | 1/2014 | Russell, III |
| 8,819,944 | B2 | 9/2014 | Farland et al. |
| 8,844,087 | B2 | 9/2014 | Marsden et al. |
| 8,844,410 | B2 | 9/2014 | Henke et al. |
| 8,856,995 | B2 | 10/2014 | Arvinte et al. |
| D719,433 | S | 12/2014 | Cooper et al. |
| 10,040,185 | B2 | 8/2018 | Davis |
| 2002/0073554 | A1 | 6/2002 | Chen |
| 2007/0074401 | A1 | 4/2007 | Myers et al. |
| 2007/0124881 | A1 | 6/2007 | Daughterty |
| 2008/0110027 | A1 | 5/2008 | Seber et al. |
| 2009/0084233 | A1 | 4/2009 | Rosso et al. |
| 2009/0139501 | A1 | 6/2009 | Hobbs |
| 2009/0293200 | A1 | 12/2009 | Rosso et al. |
| 2010/0117262 | A1 | 5/2010 | Gringer |
| 2011/0138540 | A1 | 6/2011 | Kinskey et al. |
| 2012/0137445 | A1 | 6/2012 | Arvinte et al. |
| 2012/0246946 | A1 | 10/2012 | Kreitz et al. |
| 2013/0227794 | A1 | 9/2013 | Wang |
| 2014/0173832 | A1 | 6/2014 | Kim |
| 2017/0208976 | A1 | 7/2017 | Muise et al. |
| 2018/0029213 | A1 | 2/2018 | Li |

FOREIGN PATENT DOCUMENTS

| | | | |
|---|---|---|---|
| CN | 2759727 | Y | 2/2006 |
| CN | 3509667 | | 3/2006 |
| CN | 300768755 | | 4/2008 |
| CN | 101193730 | A | 6/2008 |
| CN | 300840659 | | 10/2008 |
| CN | 300845692 | | 11/2008 |
| CN | 201432310 | Y | 3/2010 |
| CN | 301211005 | | 5/2010 |
| CN | 301456087 | | 2/2011 |
| CN | 201970322 | U | 9/2011 |
| CN | 302173179 | | 11/2012 |
| CN | 302214939 | | 12/2012 |
| CN | 302276247 | | 1/2013 |
| CN | 302296356 | | 1/2013 |
| CN | 302313081 | | 2/2013 |
| CN | 302439605 | | 5/2013 |
| CN | 204450467 | U | 7/2015 |
| DE | 3722368 | A1 | 1/1989 |
| GB | 2274615 | A | 8/1994 |
| GB | 2482945 | A | 2/2012 |

* cited by examiner

PREP TOOL

CROSS-REFERENCE TO RELATED APPLICATIONS

This application claims priority to and the benefit of U.S. application Ser. No. 16/411,824 filed on May 14, 2019, which claims priority to U.S. application Ser. No. 15/426,129 filed on Feb. 7, 2017, which claims priority to and the benefit of U.S. Provisional Application Ser. No. 62/292,568 filed on Feb. 8, 2016. The entireties of which are incorporated herein by reference.

BACKGROUND

Technical Field

Embodiments of the subject matter disclosed herein relate to a tool, and more particularly a tool for preparing a surface.

Discussion of Art

It may be desirable to have a tool that is ergonomic with stiff or flexible having solid construction during use on preparing a surface.

BRIEF DESCRIPTION

In an embodiment, a tool is provided that includes unitary plate that includes a blade portion and a tang portion. The blade portion can include an edge. The tang portion can include a positioning hole, a first hole, a slot, a second hole, a rivet hole, and one or more teeth (also referred to as one or more barbs) on a side of the tang portion. The tool can further include a hilt which includes a slot, a tab, and a notch. The tool includes an overlay on a body to create a handle for gripping the tool. The tool further includes a hammerhead on an end of the handle, the hammerhead is coupled to the handle with a rivet through the rivet hole.

In an embodiment, a tool is provided that includes at least the following: a unitary plate having a first end, a second end opposite thereto, a length between the first end and the second end, and a thickness, the first end forming a front end of a blade portion and the second end forming a rear end of a tang portion; the blade portion including a rear end opposite the front end of the blade portion; the tang portion include a front end opposite the rear end of the tang portion; a hilt member that receives the unitary plate and is located at a position on the unitary plate that transitions from the rear end of the blade portion to the front end of the tang portion, wherein the hilt member includes a front rim; the tang portion includes a first hole proximate to the front end of the tang portion, a second hole proximate to the rear end of the tang portion, a slot positioned in between the first hole and the second hole, a rivet hole proximate to the end of the tang portion, and at least one barb on each side of the tang portion in between the second hole and the rivet hole; a body that extends from the front rim to the rear end of the tang portion, wherein the body is integrated to the tang portion through at least one of the slot or the second hole; the body includes a third hole that aligns with the rivet hole; a rear rim formed on the body at a location between the second hole and the rivet hole; a pin inserted through the first hole to secure the tang portion to the body; an overlay on the body that extends from the front rim to the rear rim; and a hammerhead cap coupled to an end of the body that includes a rivet inserted through the rivet hole to fasten the hammerhead cap to the body in contact with the rear rim.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Embodiments of the provided subject matter relate to a tool. The tool is provided and includes a unitary plate that includes a blade portion and a tang portion. The tool can have a first end and a second end, wherein the first end is opposite the second end and the first end having an edge. The tang portion can include a positioning hole, a first hole, a slot, a second hole, a rivet hole, and one or more teeth (also referred to as a barb or barbs) on a side of the blade. The tool can include a hilt member which includes a slot, a tab, and a notch. The unitary plate can be positioned into the slot such that the notch engages the positioning hole and the tab supports a portion of the tang portion. The tool includes a body that is created to form a handle and is created with an injection molding. The injection molding and material can be through at least one of the first hole or the second hole and around the one or more teeth to integrate the tang portion to the body of the tool. The tool includes an overlay on the body to form the handle. The tool includes a hammerhead cap on an end of the body, the hammerhead cap is coupled to the handle with a rivet through the rivet hole. The subject application includes features of utility and ornamental design for a tool as described herein.

Figure 1:
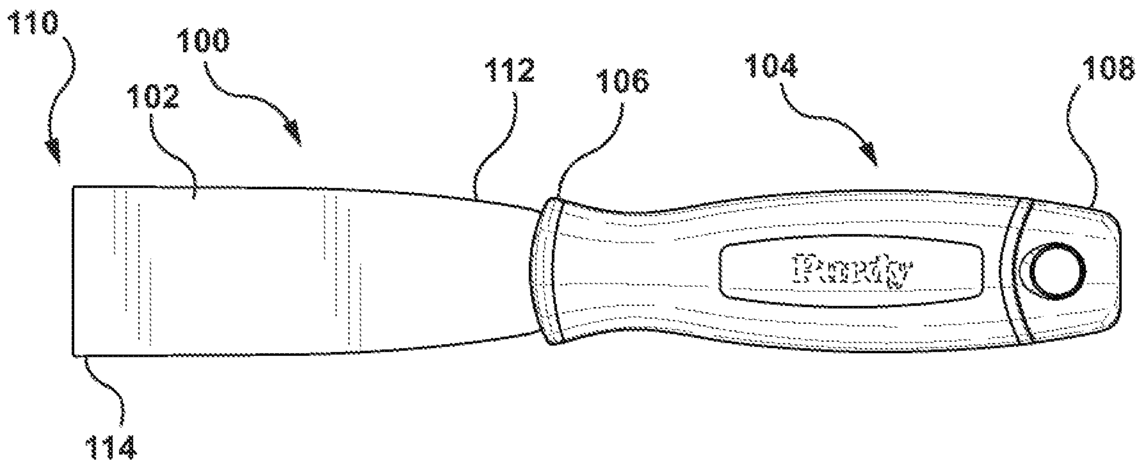
FIG. 1 is a view of a tool.

FIGS. 1-45 illustrate a tool 100 or features, components or aspects of a tool. FIG. 1 illustrates the tool 100 that includes a unitary plate 201 that includes a blade portion 102 that is exposed and a tang portion 103 that is internal to a handle 104. The handle 104 surrounds the tang portion 103 and is integrated to a portion of the tang portion 103 in order to provide stability and strength to the tool 100. The tool 100 further includes a hilt member 106 that is partially exposed from the handle 104 and partially integrated to form the handle 104. The handle 104 can be comprised from an injected material and include an overlay covering the injected material, wherein the injected material forms a body 107 (shown in at least FIGS. 16-18) and integrates with the tang portion 103 via one or more of a slot, a hole, or a combination thereof. The tool 100 can further include a hammerhead cap 108 on an end of the body 107, wherein the hammerhead cap 108 is affixed to the end of the body 107 by a rivet 109 that is through a rivet hole in the tang portion and an aligned hole through the body 107 and the hammerhead cap 108. The tool 100 provides construction that includes rigidity and durability.

The blade portion 102 can include a front end 110 and a rear end 112, wherein the rear end 112 is opposite the front end 110 and the front end 110 is a first end 202 of the unitary plate 201. The front end 110 can include an edge 114, wherein the edge 114 can be, but is not limited to being, a scraping edge, a beveled edge, a cutting edge, among others. The blade portion 102 can further include one or more edges. In another embodiment, the blade portion 102 can be a shape having one or more edges, angles, curves, and the like.

The blade portion 102 can include multiple edges or curves to provide functionality. For instance, the blade portion 102 can include one or more edges for scraping, removing of material (e.g., putty), cleaning (e.g., coating roller cleaning, paint roller cleaning, roller cleaning, etc.), enlarging or opening cracks (e.g., opening or enlarging cracks for patching, repair, touch-ups, etc.), applying a material (e.g., applying putty, etc.), among others.

The tool 100 can include at least one of the following: a scraping edge; a roller cover cleaner edge; a paint can opener edge; a spreading tool edge, an applying tool edge; a crack and caulk cleaning tool edge; a nail or bump setting tool edge; a wrench opening edge; a wrench opening for a spray gun attachment edge; a wrench opening of 11/16 inch edge; a wrench opening for 3/4 inch edge; a screw driving tool (e.g., Phillips) edge; a screw driving tool (e.g., flathead) edge, a screw driving tool storable in a compartment in the handle of the tool; a nail pulling tool edge; a bottle opener edge; a combination thereof; and/or among others. Moreover, the tool 100 can include a slot compartment to store/hold a second tool. It is to be appreciated that the blade portion 102 can include various curves, edges, shapes, configurations, orientations, and the blade portion 102 is not to be limiting on the subject innovation.

The blade portion 102 can include one or more edges or features. By way of example and not limitation, the edge can be a scraper, a spreader, a cutter, a paint can opener, a roller cleaner, a bottle opener, a paint can opener, a handle or a grip, a hex wrench, a bit, a socket, among others.

Figure 2:
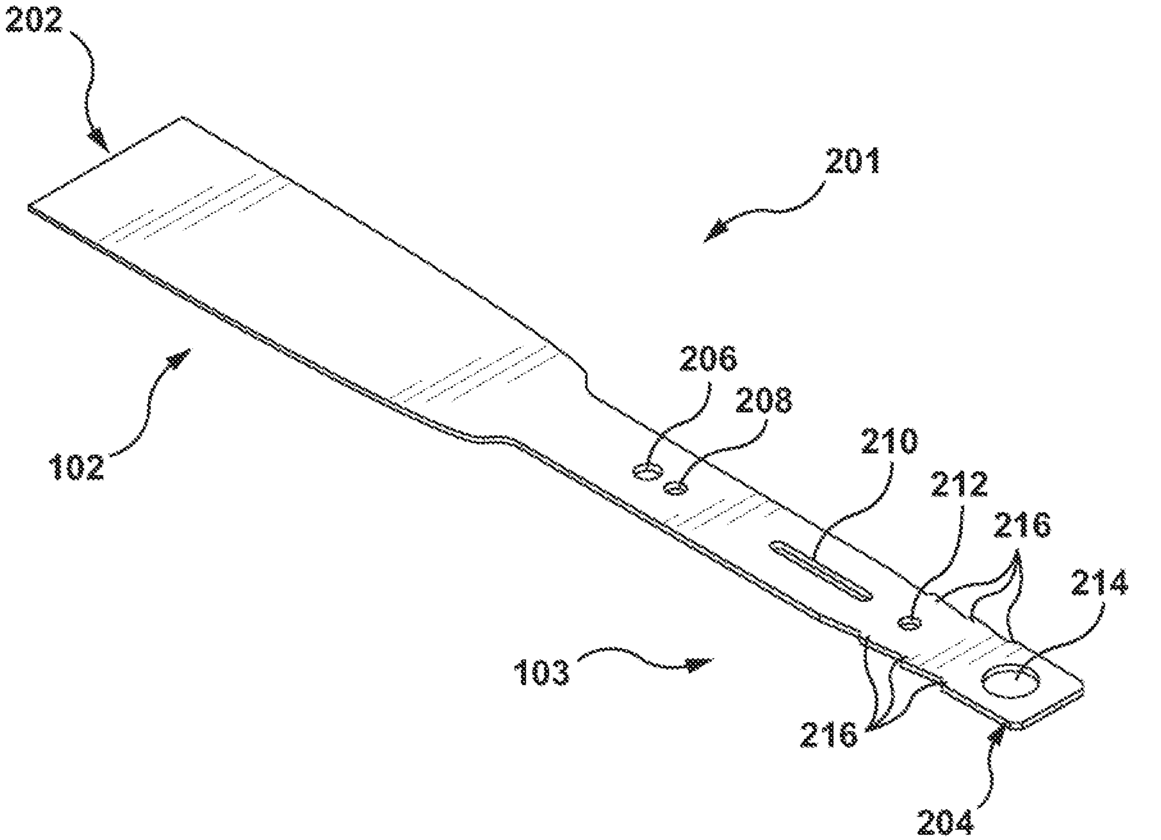
FIG. 2 illustrates a unitary plate having a blade portion and a tang portion.

Turning to FIG. 2, a perspective view of the unitary plate 201 is illustrated. The unitary plate 201 includes the first end 202 can include one or more edges for preparing a surface or for applying a force. By way of example and not limitation, the first end 202 can include the blade portion 102 and the tang portion 103. For example, but not by limitation, the tang portion 103 can be included inside the handle 104 or exterior material. The unitary plate 201 can further include a positioning hole 206, a first hole 208, a slot 210, a second hole 212 and a rivet hole 214. The unitary plate 201 can further include one or more teeth 216 (also referred to as barbs) to increase stiffness and coupling of the tang portion to a material that forms or creates the handle 104.

The tool 100 is constructed to increase rigidity, strength, and durable. The construction of the tool 100 includes utilizing a hilt 106 (discussed in at least FIGS. 4-15) and other features to ensure increased strength and stiffness of the tool 100 when constructed. As discussed above, the injection molding can be used such that the injected material flows into and through at least one of the first hole 208, the slot 210, the second hole 212, among others. It is to be appreciated that the tang portion 103 of the unitary plate 201 can include one or more apertures or holes to allow a secure bonding between the injected material that forms the handle 104 and the tang portion 103. The illustration and orientation of the first hole 208, the second hole 212, and the slot 210 is used solely for example and is not to be limiting on the subject innovation.

In another embodiment, one or more holes (e.g., the first hole 208, the second hole 212, an additional hole, a combination thereof) can be used to receive a pin to secure the tang portion 103 to a material that forms a portion of the handle 104. For instance, a pin can be inserted through the tang portion 103 and/or into a portion of the handle 104. In another embodiment, the pin can be inserted into the tang portion 103 and into a portion of a top of the handle 104 and a portion of a bottom of the handle 104. It is to be appreciated that at least one pin can be used to secure the tang portion 103 into or within the handle 104.

Figure 3:
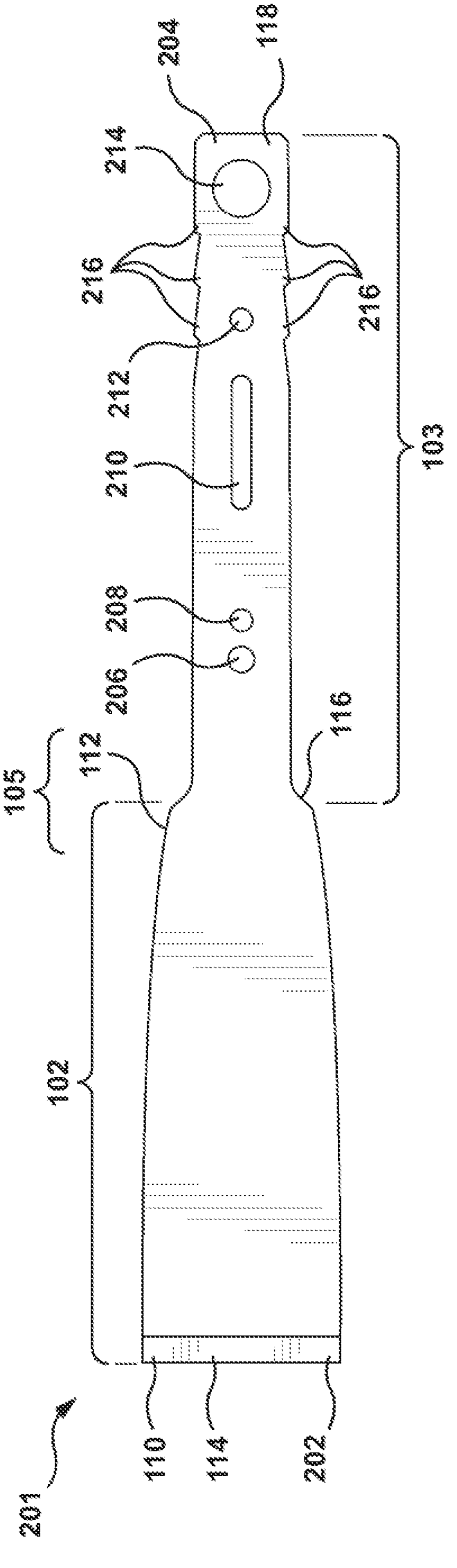
FIG. 3 illustrates a unitary plate having a blade portion and a tang portion.

Turning to FIG. 3, the unitary plate 201 is illustrated and includes the first end 201 and a second end 204 opposite thereto. The unitary plate 201 can be comprised of a solid material and in particular, a steel or metal. The unitary plate 201 can be fabricated from a stamp process, yet it is to be appreciated that the unitary plate 201 can be fabricated by various techniques or manufacturing processes selected by sound engineering judgement without departing from the scope of the subject innovation. The unitary plate 201 can include a length from the first end 202 to the second end 204 and a thickness. It is to be appreciated that the thickness of the unitary plate 201 can be uniform or vary for the blade portion 102. In other example, the thickness of the tang portion 103 can be uniform or vary.

The tang portion 103 can be rectangular in shape having a uniform width and thickness, wherein the width can vary due to one or more barbs 216 proximate to the rear end 118 of the tang portion 103. The rear end 118 can be include rounded or squared corners.

The unitary plate 201 can include the blade portion 102 and the tang portion 103. As discussed, the unitary plate 201 can include the first end 202 and the second end 204 opposite the first end 202. The blade portion 102 can include the front end 110 and the rear end 112 and the tang portion 103 can include a front end 116 and a rear end 118 opposite to the front end 116. The blade portion 102 and the tang portion 103 form the unitary plate 201 such that the blade portion 102 transitions to the tang portion 103 at a transition location 105. It is to be appreciated that the transition location 105 can be located on a defined location between the rear end 112 and the front end 116 or an overlap between the rear end 112 and the front end 116. It is to be appreciated that the first end 202 of the unitary plate 201 is the front end 110 of the blade portion 102 and the second end 204 is a rear end of the tang portion 103.

The tang portion 103 can include one or more holes, barbs (e.g., teeth), or slots in order to provide integration with a body 107 (see at least FIGS. 16-20) formed on the tang portion 103 to form the handle 104. In particular, the tang portion can include a positioning hole 206, a first hole 208, a slot 210, a second hole 212, and a rivet hole 214. Moreover, the tang portion 103 can include one or more barbs or teeth 216. It is to be appreciated that the positioning hole 206, the first hole 208, the second hole 212, and the rivet hole 214 can be a shape selected with sound engineering judgement without departing from the scope of the subject innovation and a circle shape is not to be limiting. The slot 210 is illustrated as a pill-shaped hole but the shape of the slot 210 as depicted is not to be limiting and can be selected by sound engineering judgement. The rivet hole 214 can be configured to receive a rivet 109. It is to be appreciated that the hammerhead cap 108 can be coupled via the rivet 109, a pin, a locking member, rod, or a combination thereof. The subject innovation is not limited to a rivet 109 to couple the hammerhead cap 108 to the second end 204 and the coupling can be selected with sound engineering judgment without departing from the scope of the subject innovation.

The tang portion 103 can include one or more holes or slots to integrate with a material that forms a body 107 thereon the tang portion 103. In particular, the integration between the tang portion 103 and the body 107 can be based on a material that creates the body 107 passes around the tang portion 103 as well as having the material that creates the body 107 pass through the tang portion 103 via one or more holes or slots. By having the material that creates the body 107 pass through the one or more holes or slots, the rigidity and durability of the tool 100 is increased. The barb or teeth 216 also increase integration with the body 107 with the material that creates the body 107 passing around the barbs 216.

The tang portion 103 can include any suitable number of holes or slots to integrate into the body 107. In particular, the tang portion 103 includes a hole and a slot to allow material that makes up the body 107 to pass through the tang portion 103 for integration and connectivity thereto. It is to be appreciated that the tang portion 103 can include one or more holes and/or one or slots, or a combination thereof to provide integration and connectivity.

In an example, the tang portion 103 includes a centerline from the width of the tang portion 103, wherein the positioning hole 206, the first hole 208, the slot 210, the second hole 212, and the rivet hole 214 are aligned. In an embodiment, one or more of the positioning hole 206, the first hole 208, the slot 210, the second hole 212, or a combination thereof can be unaligned with the centerline.

In an example, the slot 210 can be positioned proximate to a center of the tang portion 103 between the front end 116 and the rear end 118. It is to be appreciated the slot 210 can be off center between the front end 116 and the rear end 118. The positioning hole 206 can be located on a portion of the tang portion 103 in between the slot 210 and the front end 116. The first hole 208 can be positioned between the positioning hole 206 and the slot 210. The second hole 212 can be positioned between the slot 210 and the rivet hole 214. The rivet hole 214 can be positioned on or proximate the rear end 118.

The first hole 208 can be configured to receive a pin that engages the body 107 and the tang portion 103. The positioning hole 206 can be configured to receive a notch 306 situated on a tab 302 of a hilt member 106 (discussed in more detail below). As discussed, the barbs 216, the slot 210 and the second hole 212 can couple and integrate the body 107 to the tang portion 103 based on the material that creates the body 107 passing through the second hole 212 and the slot 210 and the material engaged around the barbs 216.

Figure 4:
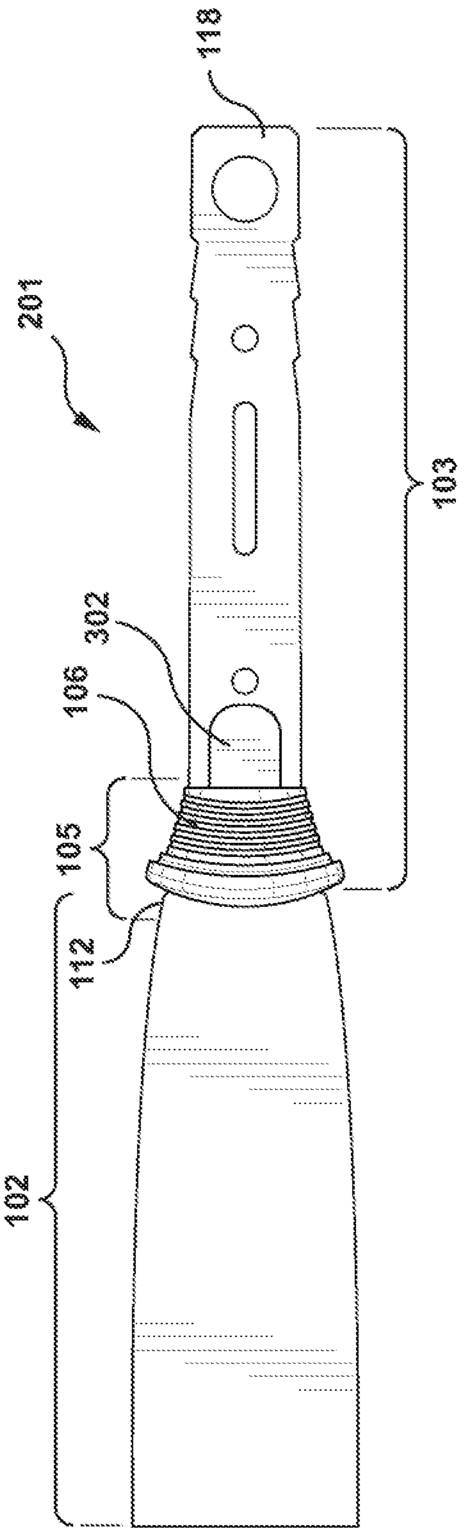
FIG. 4 illustrates a unitary plate having a blade portion and a tang portion with a hilt member coupled thereon.
Figure 5:
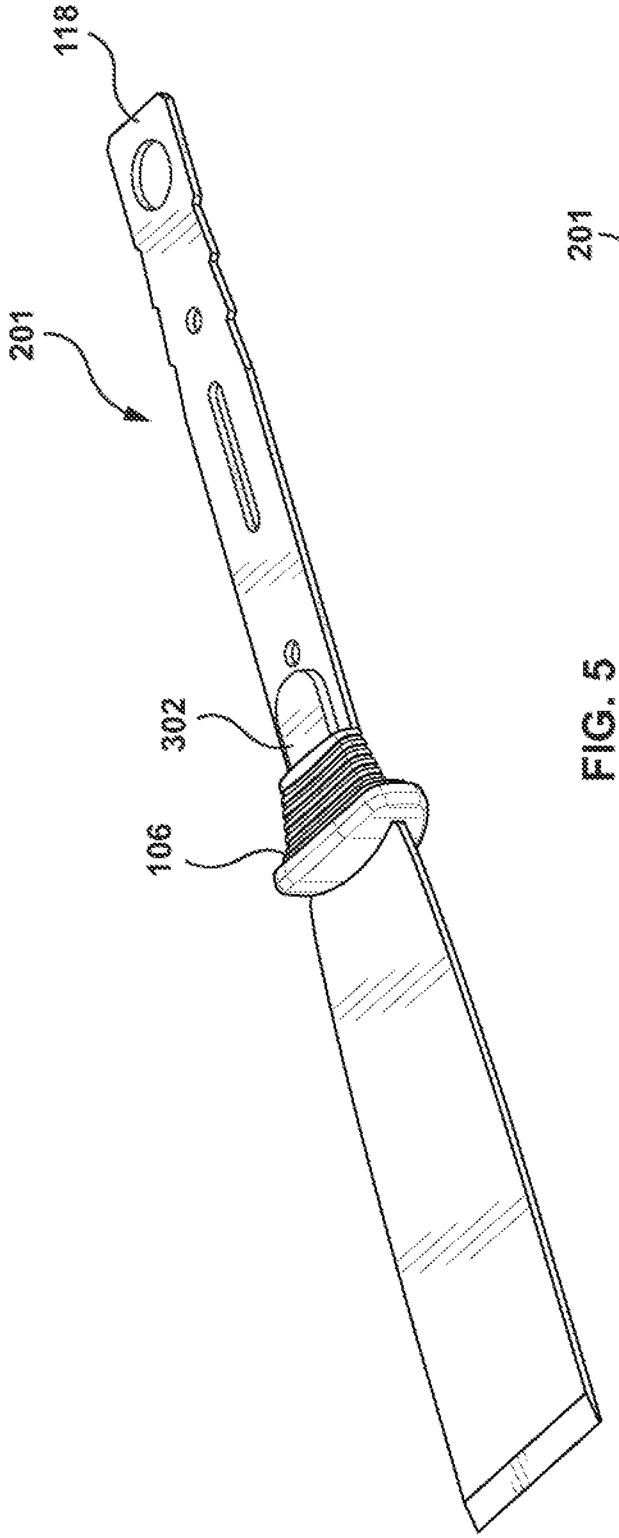
FIG. 5 illustrates a unitary plate having a blade portion and a tang portion with a hilt member coupled thereon.
Figure 6:
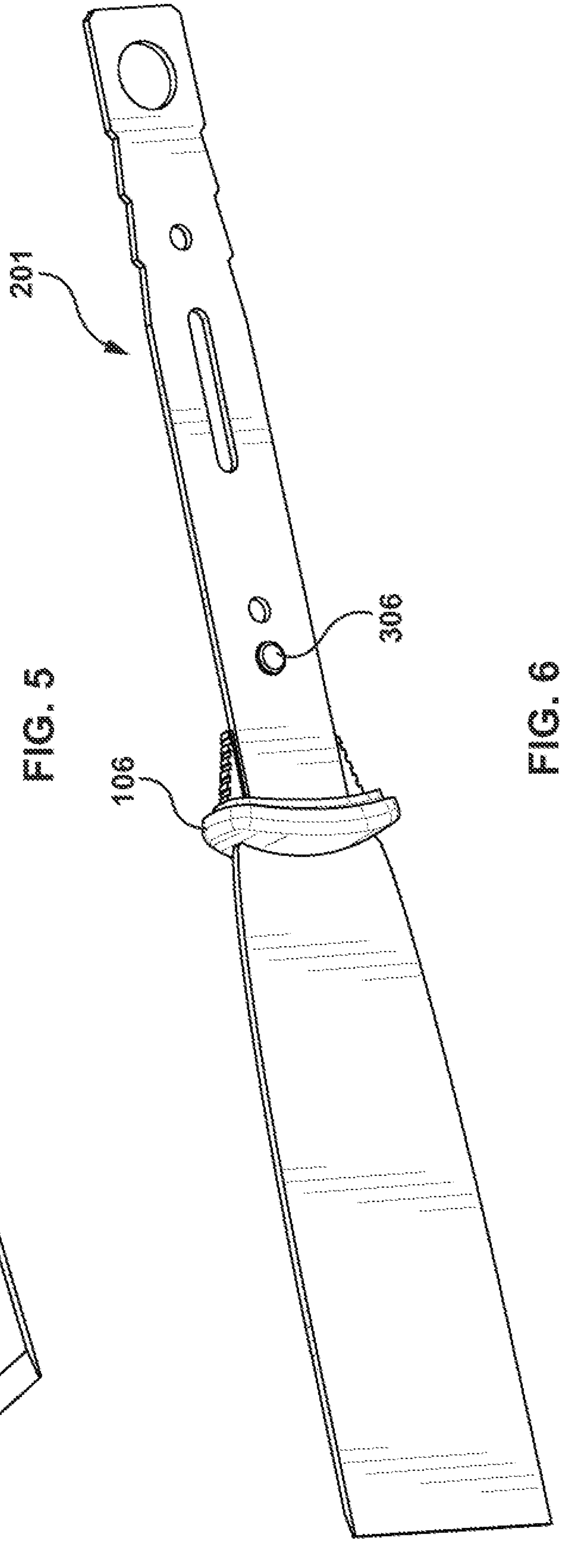
FIG. 6 illustrates a unitary plate having a blade portion and a tang portion with a hilt member coupled thereon.
Figure 8:
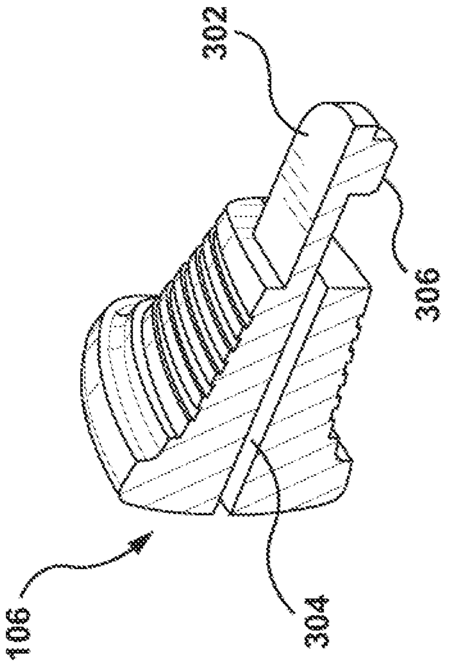
FIG. 8 is a cross-sectional lengthwise view of the hilt member.

FIGS. 4-6 illustrate views of the unitary plate 201 with the hilt member 106 coupled thereto at the transition location 105. The hilt member 106 can include a through passage 304 that receives the unitary plate 201. In particular, the hilt member 106 can be placed on the tang portion 103 from the rear end 118 and moved up to the transition location 105. The hilt member 106 provides stability to the tang portion 103 as a portion of the front end 116 of the tang portion is supported by the hilt member 106.

The hilt member 106 is illustrated in more detail in FIGS. 7-15. The hilt member 106 can include a length between a front end 301 and a rear end 303, wherein the rear end 303 can include a tab 302 having a notch 306 configured to engage the positioning hole 206 on the tang portion 103. A through passage 304 can be between the front end 301 and the rear end 303 that is configured to receive the tang portion 103 such that the hilt member 106 is situated at the transition location 105 on the unitary plate 201.

The hilt member 106 can include a front rim 305 that is located on the front end 301 and is about a circumference of the hilt member 106. The front rim 305 can be configured to abut the rear end 112 of the blade portion 102. The hilt member 106 can further include a ridge 307 proximate to the front rim 305, the ridge 307 surrounds the through passage 304 about a circumference of the hilt member. The hilt member 106 can include additional ridges 308 proximate to the ridge 307 in which the additional ridges 308 are lengthwise from the ridge 307 to the tab 302 on the hilt member 106.

Figure 10:
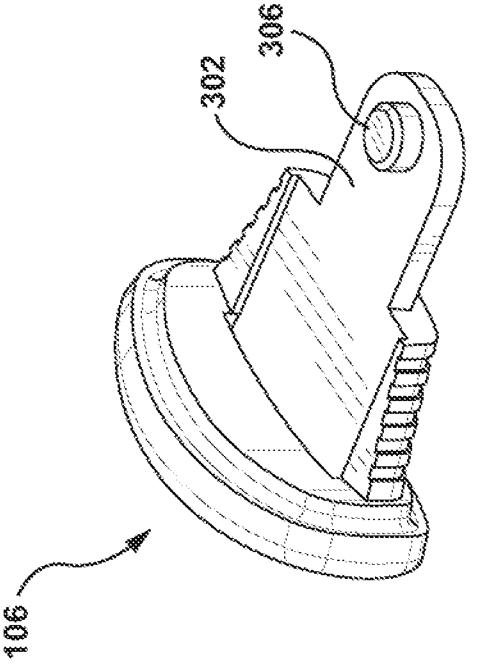
FIG. 10 illustrates a hilt member.
Figure 7:
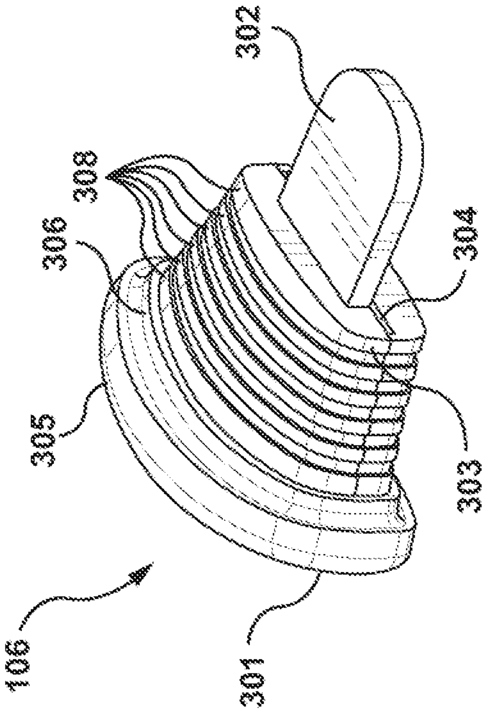
FIG. 7 illustrates a perspective view of a hilt member.
Figure 9:
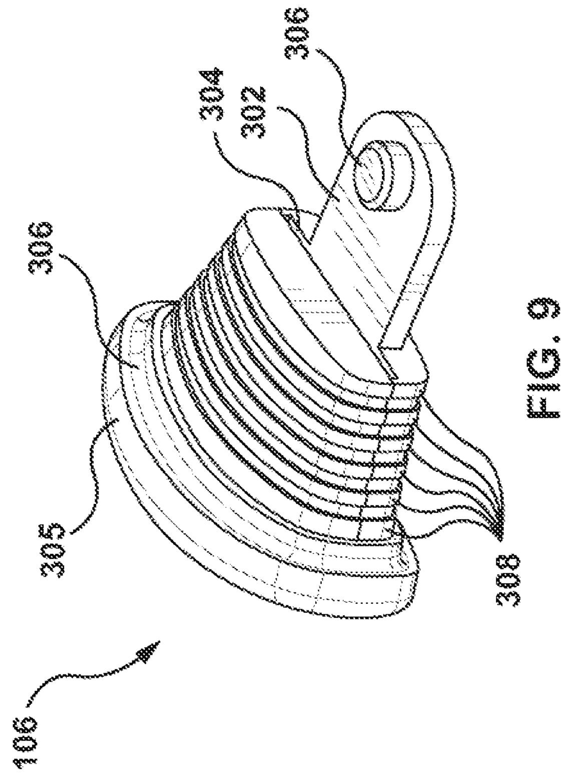
FIG. 9 illustrates a perspective view of a hilt member.
Figure 11:
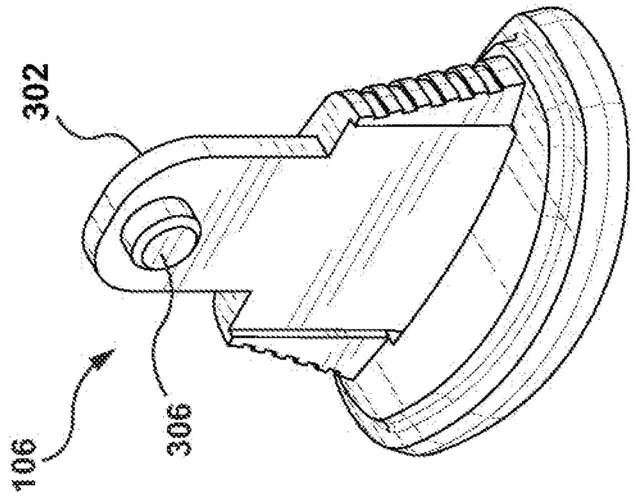
FIG. 11 illustrates a perspective view of a hilt member.
Figure 12:
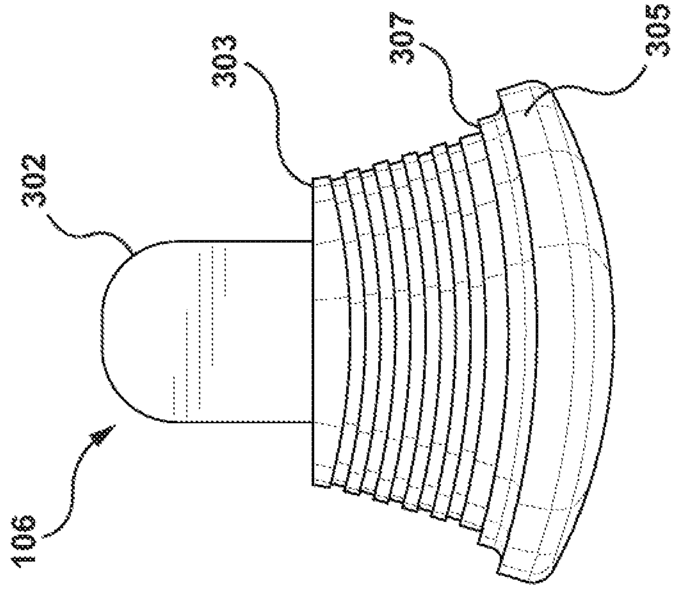
FIG. 12 illustrates a hilt member in accordance with the subject innovation.
Figure 13:
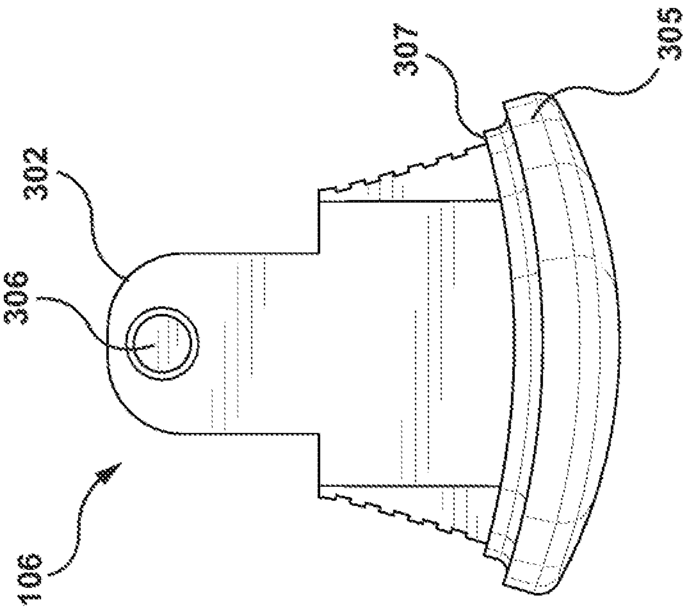
FIG. 13 illustrates a hilt member in accordance with the subject innovation.
Figure 14:
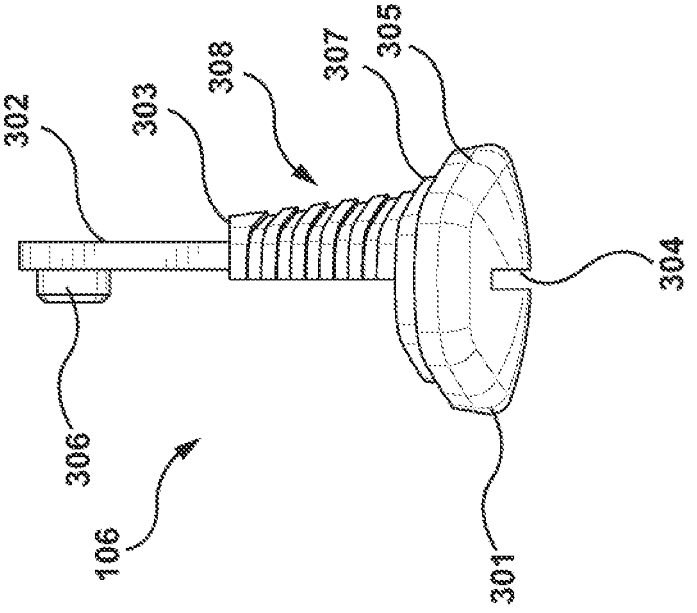
FIG. 14 illustrates a hilt member in accordance with the subject innovation.

The hilt member 106 can include a tab 302 to support the blade 102 and a through passage 304 to receive the unitary plate 201. The unitary plate 201 or a portion of the unitary plate 201 can be inserted into the through passage 304. In addition, the hilt member 106 can include a notch 306 that couples to the positioning hole 206 on the tang portion 103. The hilt member 106 is illustrated in an embodiment in FIGS. 7-9 in which additional ridges 308 surround the through passage 304 about a circumference of the hilt member 106. In another embodiment, the hilt member 106 can include less material as illustrated in FIG. 10 in which a side of the hilt member 106 that include the notch 306 does not include additional ridges 308.

Figure 15:
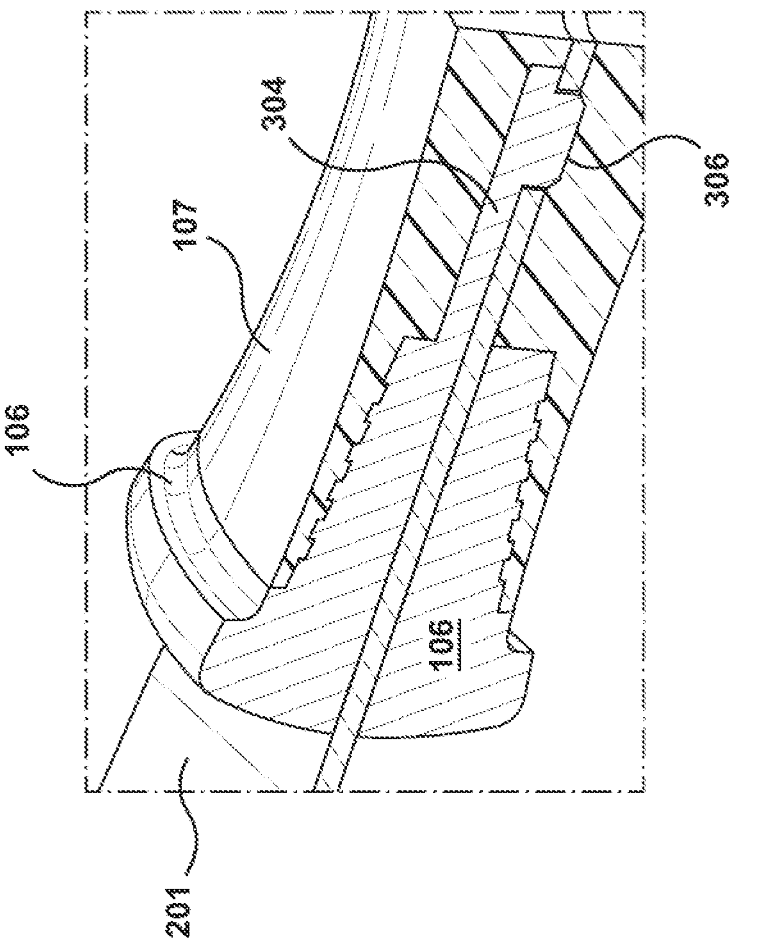
FIG. 15 is a cross-sectional view of a body formed on a tang portion of the unitary plate that includes the hilt member.

FIG. 15 is a cross-sectional view of a portion of the tool 100 in which the hilt member 106 is integrated into the body 107 that forms a portion of the handle 104. Depending on the selection of material that the body is formed or fabricated from, the hilt member 106 can be formed integral to the body 107. In particular, if an injected molding process is used to form the body 107 around the tang portion 103, an exterior surface of the hilt member 106 (e.g., from the front rim 305 to the tab 304 and notch 306) will meld with the body 107. For instance, the injected material will melt a portion of the exterior surface of the hilt member 106 and become part of the body 107. In particular, one or more of the additional ridges 308 will melt into the body 107.

Figure 16:
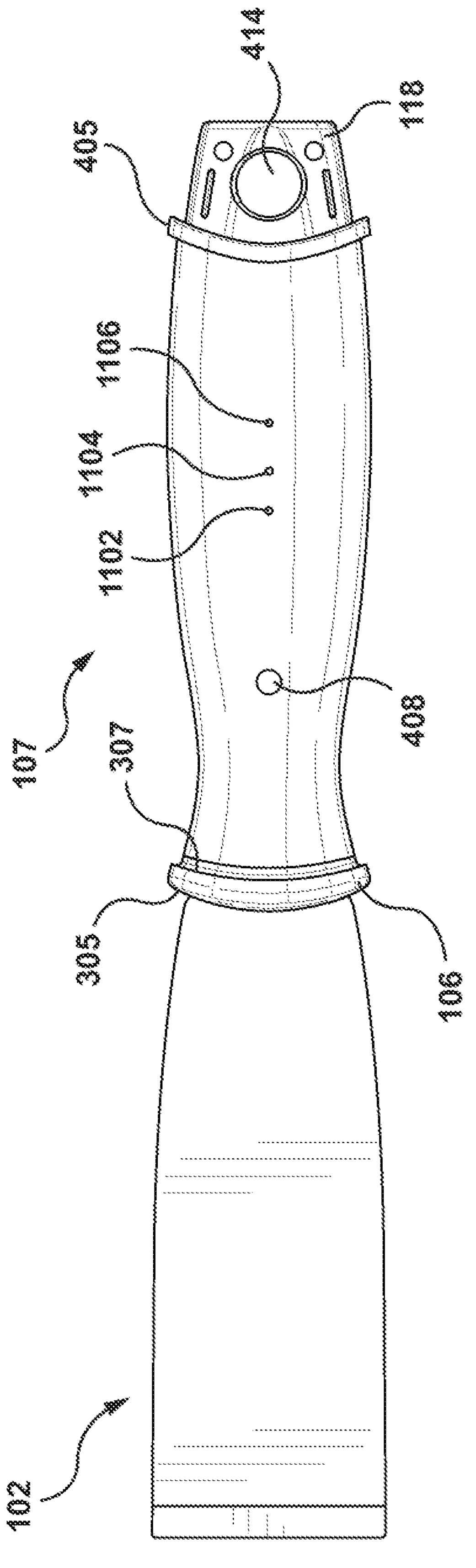
FIG. 16 illustrates a tool with a body integrated to the tang portion of the unitary plate.
Figure 17:
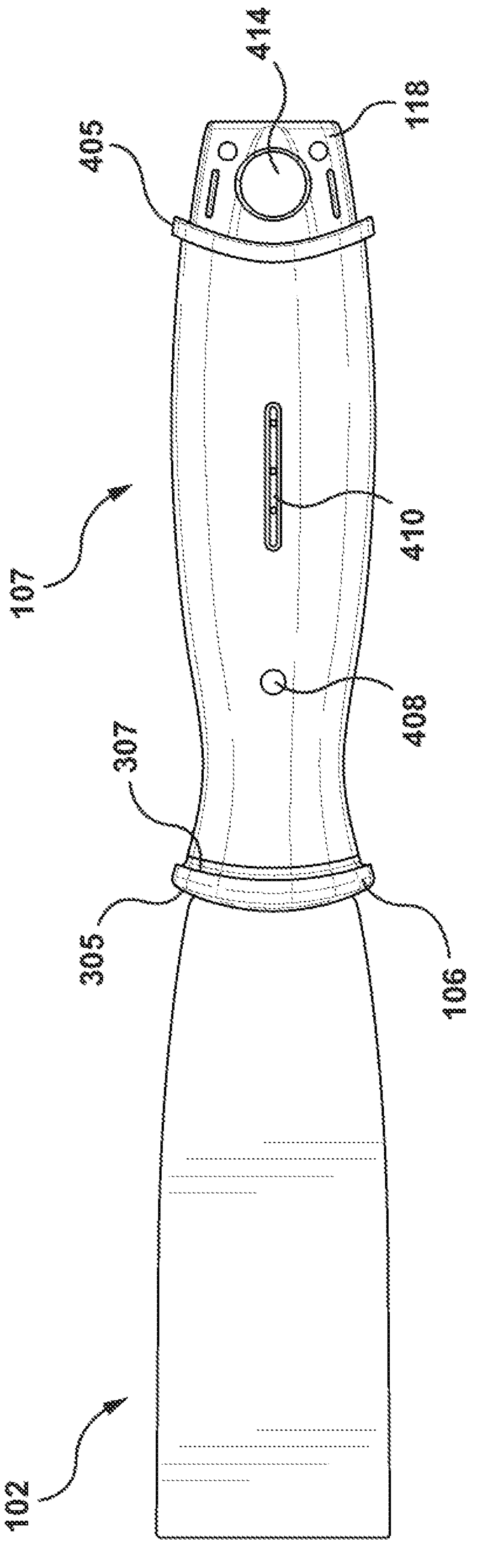
FIG. 17 illustrates a tool with a body integrated to the tang portion of the unitary plate.
Figure 18:
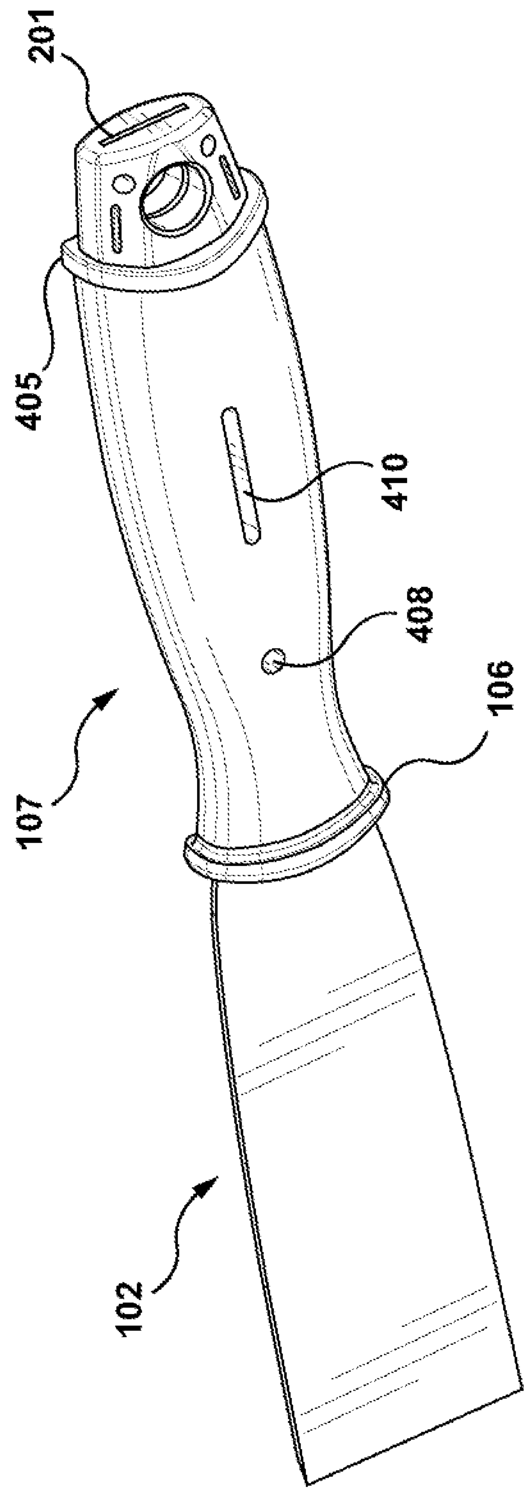
FIG. 18 illustrates a tool with a body integrated to the tang portion of the unitary plate.

FIGS. 16-18 illustrate the body 107 fabricated on and around the tang portion 103 to create the handle 104 or a portion of the handle 104. As discussed, the body 107 can be fabricated from an injected material that flows in order to integrate with the tang portion 103 of the unitary plate 201. The body 107 extends from the ridge 307 toward the rear end 118 of the tang portion 103. In other words, the length of the body 107 extends from the ridge 307 to the rear end 118 of the tang portion 103. Thus, the body 107 terminates at the rear end 118 of the tang portion 103. The body 107 can be formed to include apertures or holes aligned with one or more holes or slots included on the tang portion 103. As illustrated, the rear end 118 of the tang portion 103 of the unitary plate 201 is illustrated on an end of the body 107 in FIG. 18.

As discussed, the body 107 can be created around the tang portion 103 between the front rim 305 and the rear end 318 of the tang portion 103. In an embodiment, the body 107 can be an injected material such as, but not limited to, a plastic. The body 107 can be created to form a portion of the handle 104. The injected material, which can be, but is not limited to being, plastic, can be injected so as to attach to and around the tang portion 103 and a portion of the hilt member 106.

The body 107 can include a rear rim 405 that includes a circumference around the body 107 providing a separation that terminates into where the hammerhead cap 108 will secure. The rear rim 405 can include a shape and curvature similar to the front rim 305 for aesthetics, wherein the front rim 305 and the rear rim 405 define a gripping region that is referred to generally as the handle 104. In particular, the rear rim 405, from the front side of the tool 100, can include a curve that extends toward the front rim 305 and the front rim 305 can include a curve that extends toward the blade portion 102. The front rim 305 can include a circumference around the hilt member 106. In addition, the rear rim 405 can include a circumference around the body 107. As discussed in FIG. 21, an overlay 2102 can be fabricated in between the front rim 305 and the rear rim 405 to provide texture that is more tacky to grip or hold.

Moreover, the handle 104 can be created by the injected material and a mold can create one or more holes (e.g., first hole 208, second hole 212, or another hole). The holes that are not filled with the injected material to create the handle 104 can be used to insert or secure one or more pins through the handle 104 (e.g., the injected material) and/or the blade 102.

It is to be appreciated that the body 107 can include one or more holes or one or more slots in order to facilitate coupling to the tang portion 103 of the unitary plate 201 and/or provide additional injection molding via the slot 410 and one or more gating holes (discussed below).

By way of example and not limiting to the subject innovation, the body 107 can include a first aligned hole 408 for the first hole 208 positioned on the tang portion 103 of the unitary plate 201. The body 107 can further include a second aligned hole 414 that aligns with the rivet hole 214. Moreover, the body 107 can include an aligned slot 410 that aligns with the slot 210. The aligned slot 410 and the slot 210 can be utilized to integrate with the tang portion 103 of the unitary plate 201 and allow an entry for injecting a second material to form a portion of the handle 104. It is to be appreciated that the body 107 can include an additional aligned hole for the second hole 212).

Figure 25:
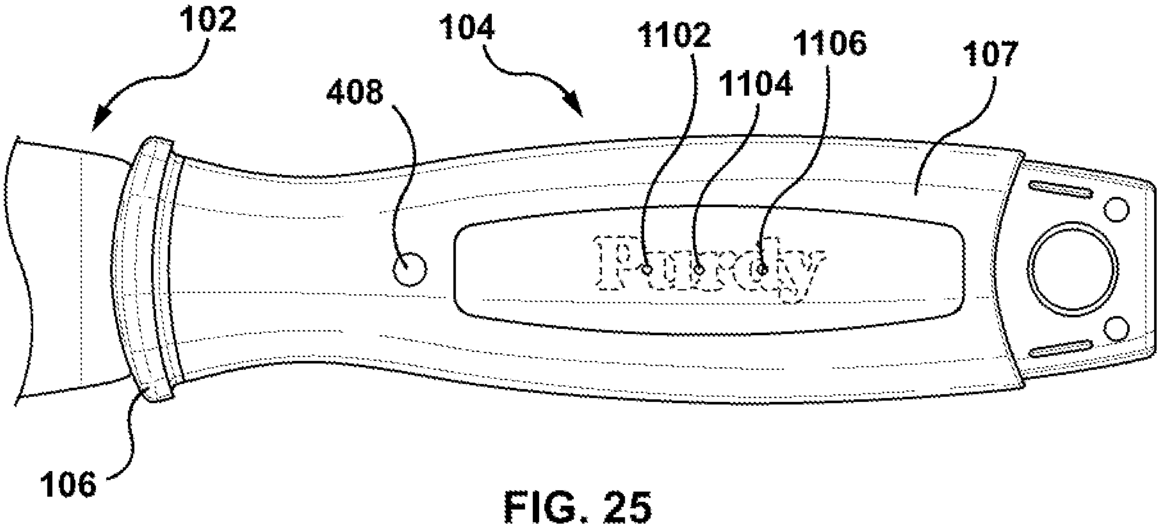
FIG. 25 illustrates a tool having one or more gating holes in the handle created by injected material.

In a particular example, the aligned slot 410 and the slot 210 can be used to inject a second material or the first material of the body 107 with a different color to form a logo, symbol, or letter(s) on the body 107. In this example, one or more gating holes (first gating hole 1102, second gating hole 1104, and third gating hole 1106) can be used. As depicted, the aligned slot 410 is located on a backside of the tool 100 (FIG. 26) and the gating holes can be on a front side of the tool 100 (FIG. 25). It is to be appreciated that an embodiment can include one or more gating holes and the amount can be selected with sound engineering judgment without departing from the scope of the subject innovation. For example, the body 107 can include seven (7) gating holes.

Figure 19:
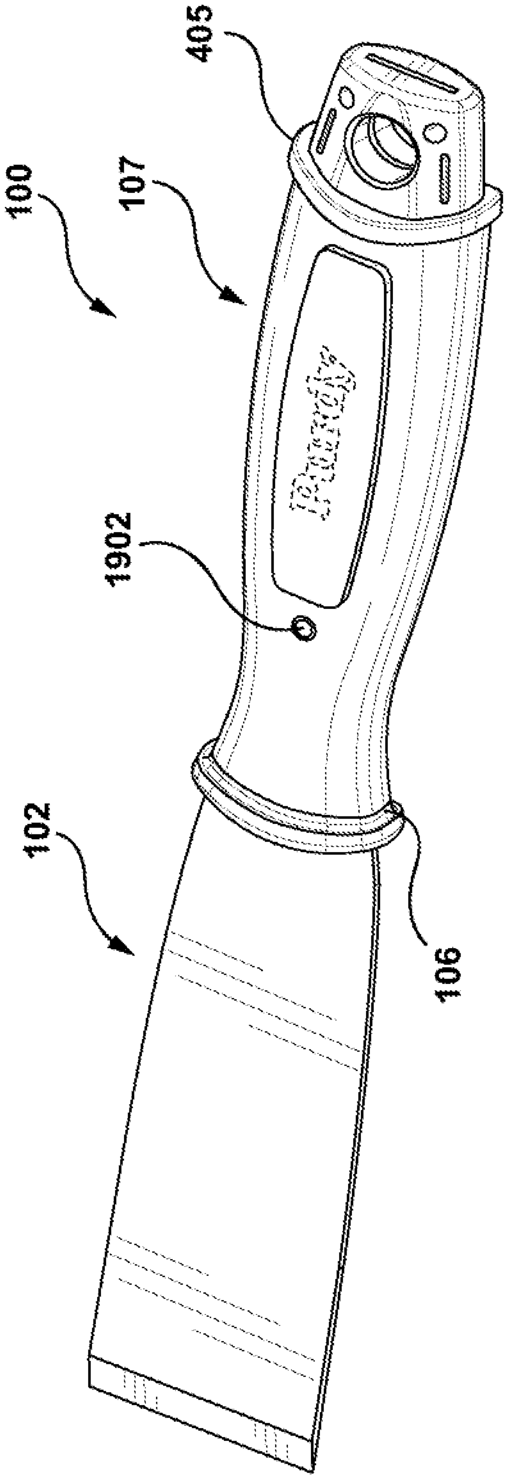
FIG. 19 illustrates a tool with a body integrated to the tang portion of the unitary plate with a pin installed.
Figure 20:
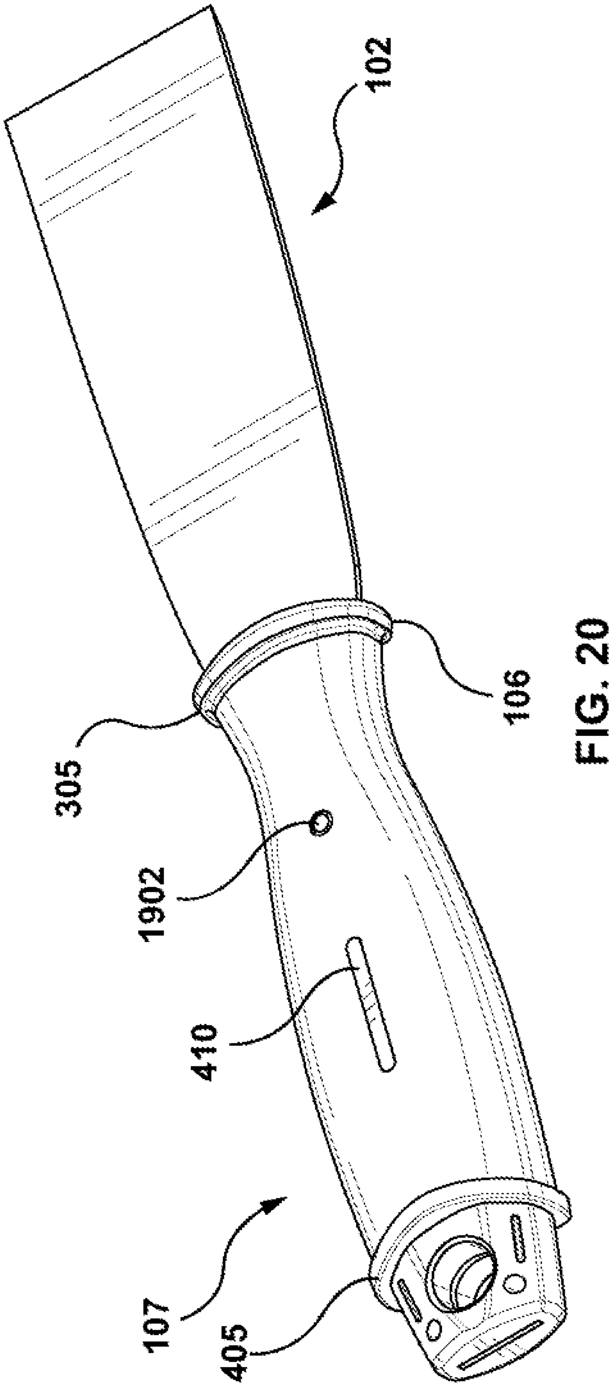
FIG. 20 illustrates a tool with a body integrated to the tang portion of the unitary plate.
Figure 26:
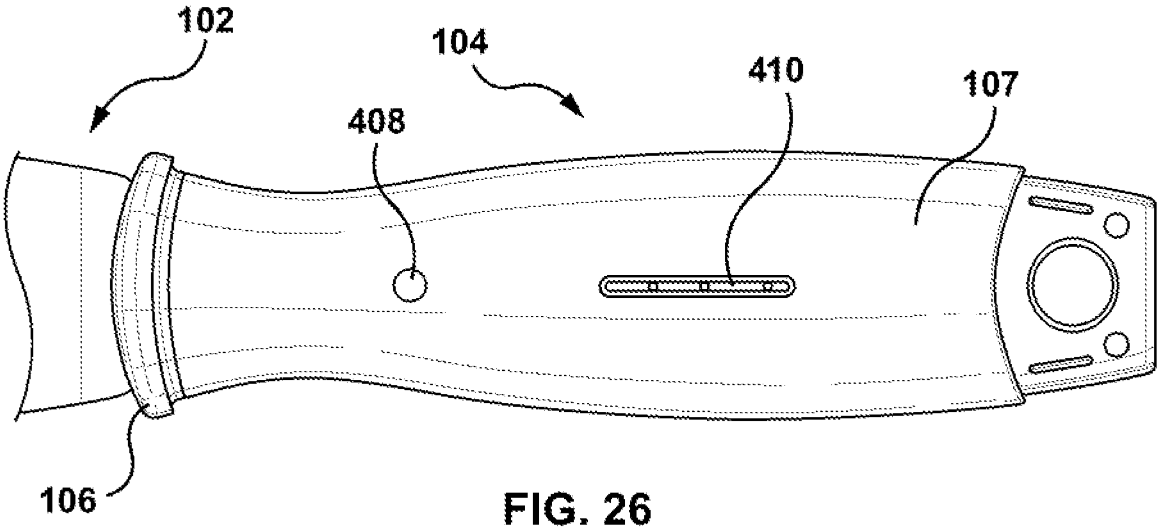
FIG. 26 illustrates a tool having a slot that interconnects to the one or more gating holes on the handle.
Figure 27:
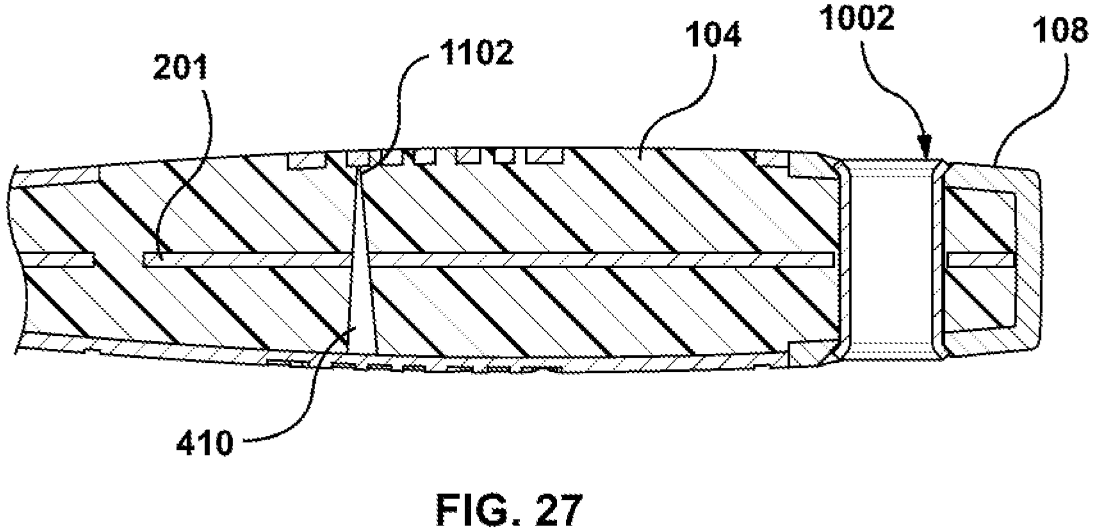
FIG. 27 is a cross-sectional view of handle of the tool.
Figure 28:
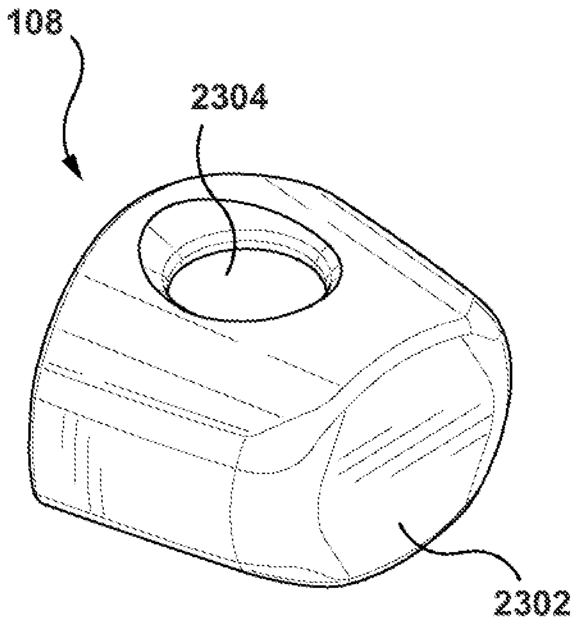
FIG. 28 illustrates the hammerhead cap.

Turning to FIGS. 25-26, the tool 100 is illustrated having the blade portion 102 and the body 107 that forms a portion of the handle 104 (created by the injected material), wherein the material of the body 107 surrounds a portion of the tang portion 103 of the unitary plate 201. The body 107, after created by injected material, can be fabricated to include the aligned slot 410 that connects though the body 107 to the other side at a first gating hole 1102, a second gating hole 1104, and a third gating hole 1106 (collectively referred to as "the gating holes"). It is to be appreciated that there can be one or more gating holes and the example of three gating holes is not to be limiting on the subject innovation. The slot 410 and the gating holes allow a logo to be injected with material. In other embodiment, the slot 410 and the gating holes are used to inject a second material to form a portion of the body 107 or a portion that forms a portion of the handle 104. For example, a portion of the body 107 can be created by with a first material and the slot 410 can be used to inject a second material. The slot 410 and the gating holes can be further illustrated in FIG. 27 which is a cross-sectional view, in which a triangular shape is used to deliver injected material to create a logo, symbol, or letter(s) so such can be depicted on the front side of the tool 100. FIGS. 19-20 illustrate a logo created with a second material on a front side of the body 107 using an injection material technique with a first material and the second material using the aligned slot 410, the slot 210, and gating holes.

As described and discussed above, the tang portion 103 can be secured to the body 107 with one or more pins that couple the tang portion 103 via a hole or slot to the body 107. In particular, a pin inserted via a hole or slot can be used to provide a more "stiff" blade rather than a "flex" blade. It is to be appreciated that a flexible blade portion 102 may not include one or more pins and that a stiff blade portion 102 can include one or more pins. Turning to FIG. 19, the tool 100 is illustrated with a pin 1902 inserted into the aligned first hole 408 and first hole 208 to facilitate coupling of the tang portion 103 to the body 107. It is to be appreciated that one or more pins can be used to secure the tang portion 103 to the body 107 and the pin 1902 used in the first aligned hole 408 and the first 208 is not to be limiting. For example, the first hole 208 can be used to integrate with the body 107 without a pin (e.g., allowing material to pass through the first hole 208) and second hole 212 can be used for a pin. In such example, body 107 would include an aligned hole for the second hole 212 and a pin can be inserted therein. As depicted in FIG. 19, the pin 1902 is placed on an upper portion of the body 107 to increase stability and rigidity of the tool 100. The pin 1902 can be metal, plastic, a wood, a natural fiber, a composite material, or a combination thereof. In another embodiment, a second pin can be used with the tool 100 to secure the tang portion 103 to the body 107 in which the second pin corresponds to the second hole 212 and the first pin 1902 corresponds to the first hole 208. Moreover, any suitable number of pins and holes can be used to secure the tang portion 103 to the body 107.

Figure 21:
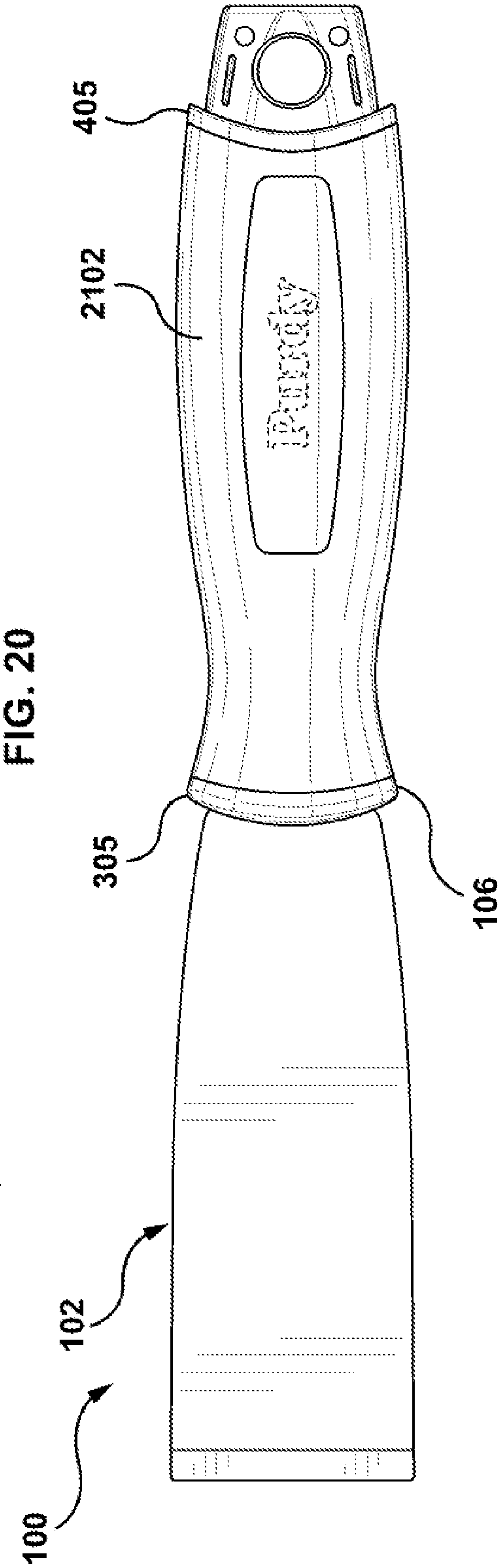
FIG. 21 illustrates a tool having an overlay.

Turning to FIG. 21, the tool 100 is illustrated with the overlay 2102 between the front rim 305 and the rear rim 405 on the front side and the rear side of the body 107 to form a portion of the handle 104. The overlay 2102 can exclude a portion of area predefined prior to the creation of the body 107. Moreover, the portion of area predefined can be aligned with a logo, symbol, and/or letter(s) formed via the gating holes and aligned slot 410 and slot 210. The overlay 2102 can be an exterior for a portion of the handle 104 and can be a material selected by sound engineering and judgment without departing from the scope of the subject innovation. By way of example and not limitation, the overlay 2102 can be a Thermal Plastic Rubber (e.g., also referred to as (TPR)), a plastic, a molded material, a composite material, a natural fiber, a synthetic fiber, among others. The exterior of the handle 104 can be partially fabricated with a plastic, a rubber, a TPR (Thermal Plastic Rubber) overmold, or a combination thereof. The TPR can be, but is not limited to being, a hardness (Actual Shore Value) of 74±4.

Figure 22:
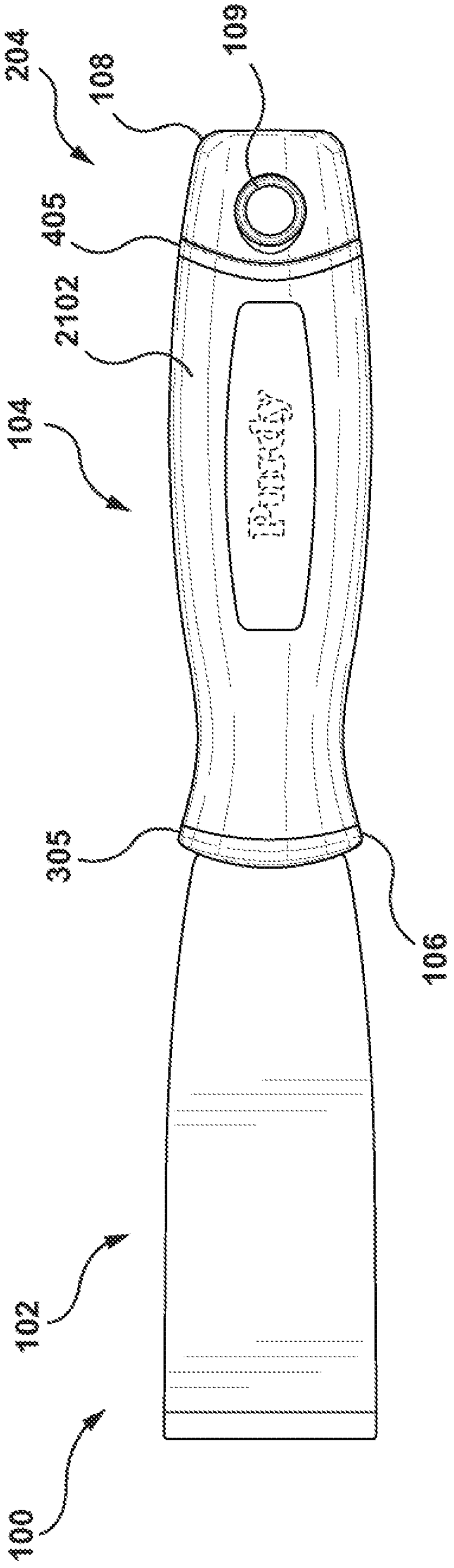
FIG. 22 illustrates a tool having a hammerhead cap.
Figure 24:
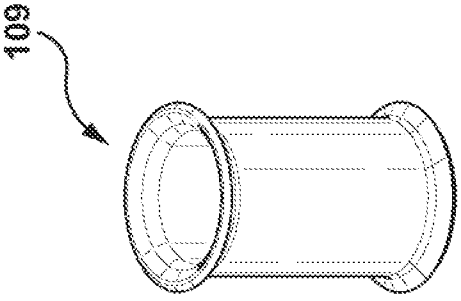
FIG. 24 illustrates a rivet used to couple the hammerhead cap to the tool.
Figure 23:
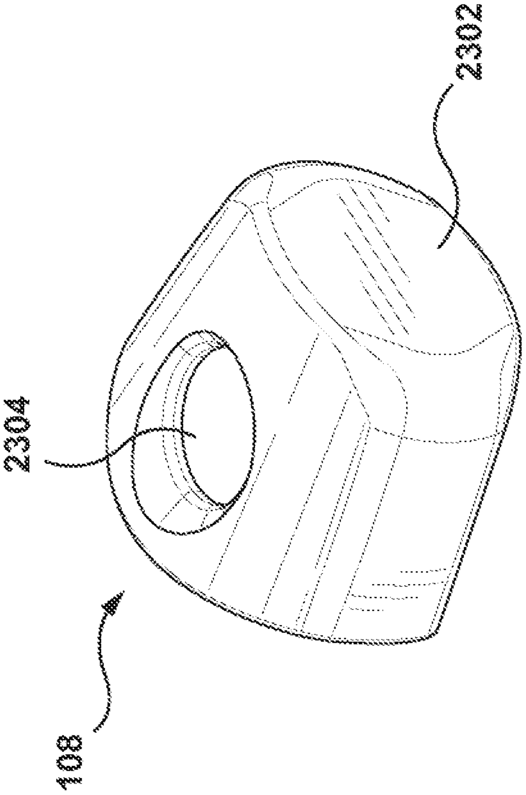
FIG. 23 illustrates a hammerhead cap.

FIG. 22 illustrates the tool 100 that includes the hammerhead cap 108 that is coupled to the second end 204 of the tool 100. The hammerhead cap 108 can be configured to secure to the end of the body 107 to abut the rear rim 405. The rivet 109 can be used to pass through the rivet hole 214, the aligned rivet hole 414. It is to be appreciated that the hammerhead cap 108 can be coupled to the second end 204 of the tool 100 with sound engineering judgment and can be, but is not limited to, a rivet, a rod, a pin, a connecting member, a bolt, a screw, a nail, among others.

The hammerhead cap 108 is positioned to be in contact with the rear end 118 of the tang portion 103 of the unitary plate 201. In particular, the inside of the hammerhead cap 108 is in contact with the rear end 118 of the tang portion 103 as well as the end of the body 107.

FIGS. 23-24 and 28-30 illustrate the hammerhead cap 108 and the rivet 109 in more detail. The hammerhead cap 108 can include a striking surface 2302, a front side, a back side, and sidewalls connecting thereto to create a female member that mates with a male member, wherein the male member is the end of the body 107. The front side of the hammerhead cap 108 is illustrated in FIG. 22. The back side of the hammerhead cap 108 is a mirror image of the front side. The front side and the back side of the hammerhead cap 108 can include a first rivet aperture and a second rivet aperture respectively (collectively referred to as "rivet apertures 2304"). The rivet apertures 2304 are aligned to the rivet hole 214 and the aligned rivet hole 414, wherein each collectively are configured to receive the rivet 109 (illustrated in detail in FIG. 24). Additionally, the rivet apertures 2304 are configured to receive the rivet 109 such that an aperture is existent through the hammerhead cap 108 and the tool 100.

Figure 29:
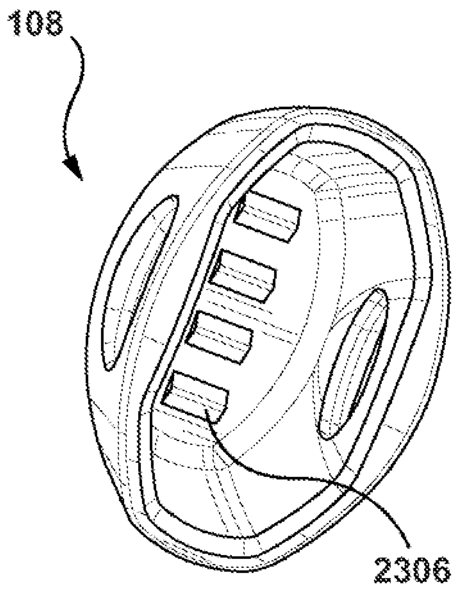
FIG. 29 illustrates the inside of the hammerhead cap.
Figure 30:
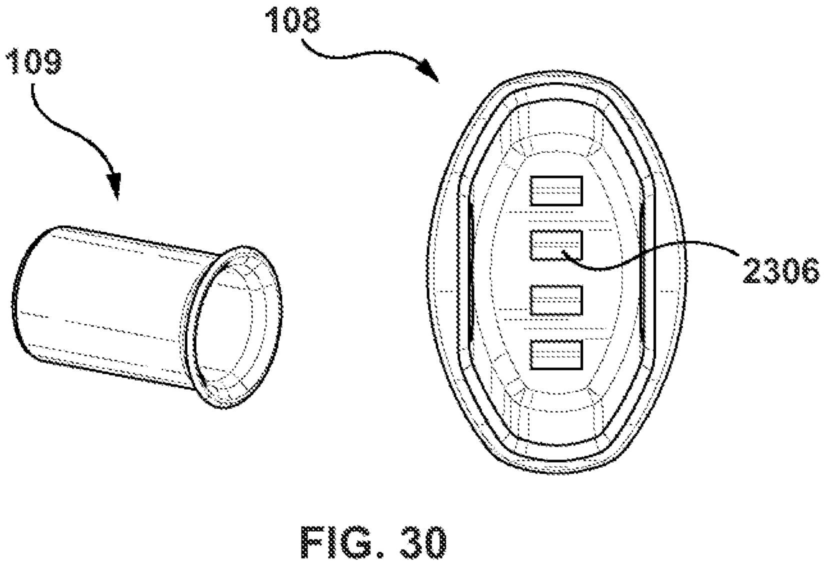
FIG. 30 illustrates the hammerhead cap and a rivet.

An inside of the hammerhead cap 108 is depicted in FIGS. 29 and 30, wherein the interior surface opposite the striking surface 2302 can include one or more teeth 2306. The one or more teeth 2306 can be in contact with the rear end 118 of the tang portion 103 of the unitary plate 201. In another embodiment, one or more teeth can be positioned on the rear end 118 of the tang portion 103 of the unitary plate 201.

As discussed, the hammerhead 108 can be fitted on the second end 204 of the body 107 which encases the tang portion 103. The rivet 109 can be inserted through the hammerhead cap 108, through the body 107 that forms handle 104 (e.g., the injected material), and through the rivet hole 214 of the unitary plate 201. It is to be appreciated that a pin or other object can be inserted and the subject innovation is not limited to a rivet. In particular, a connecting member can be used to secure the handle 104, the tang portion 103, and the hammerhead 108.

As discussed, in another embodiment, the second end 204 of the tool 100 (in particular the rear end 118 of the tang portion 103 of the unitary plate 201) can include two or more teeth 2306 to contact an inside portion of the hammerhead cap 108. There can be a plurality of teeth 2306 that provide multiple contact points with the inside of the hammerhead cap 108. In another embodiment, the hammerhead cap 108 can include an inside portion that includes two or more teeth 2306 to contact the rear end 118 of the tang portion 103 of the unitary plate 201.

Figure 31:
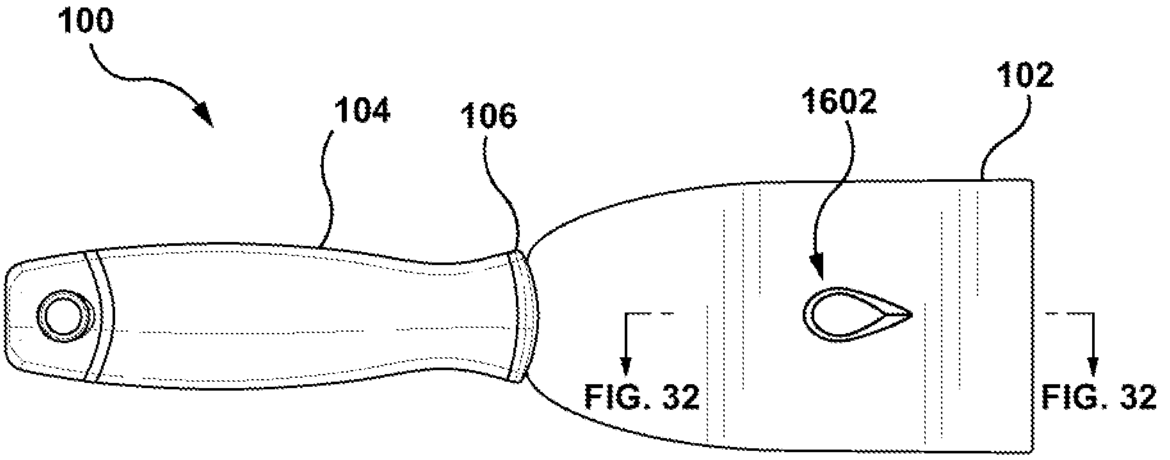
FIG. 31 illustrates the tool having a nail remover.
Figure 32:
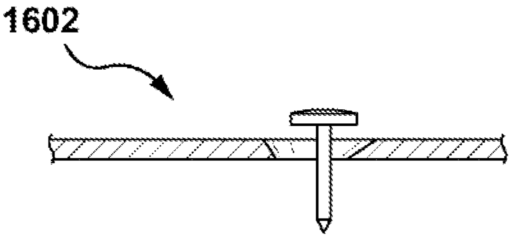
FIG. 32 is a cross-sectional view of the blade of the tool having a nail remover.
Figure 33:
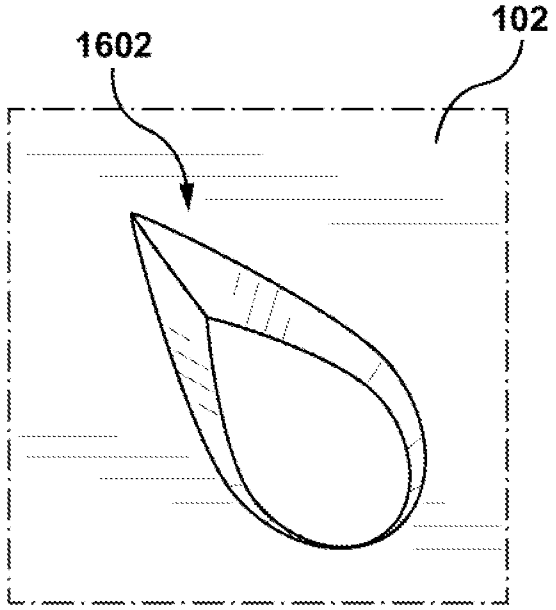
FIG. 33 is a view of a nail remover used with the tool.

FIGS. 31-33 illustrate a nail remover 1602 that can be included on the blade portion 102 or within the blade portion 102. The nail remover 1602 can include a ramp connecting an inner diameter on a bottom side of the blade portion 102 and an outer diameter on a top side of the blade 102, wherein the inner diameter is smaller than the outer diameter. It is to be appreciated that the nail remover 1602 can be a shape such as, but not limited to, a circle, an oval, a diamond, a square, a rectangle, a triangle, a polygon, an ellipse, a trapezoid, an pentagon, an octagon, among others. As illustrated in the cross-sectional view in FIG. 32, the nail remover 1602 can include a decreasing thickness to the opening that receives a nail head or item that is to be removed. In another example, the cross-sectional view of the nail remover 1602 can include a uniform thickness.

Figure 34:
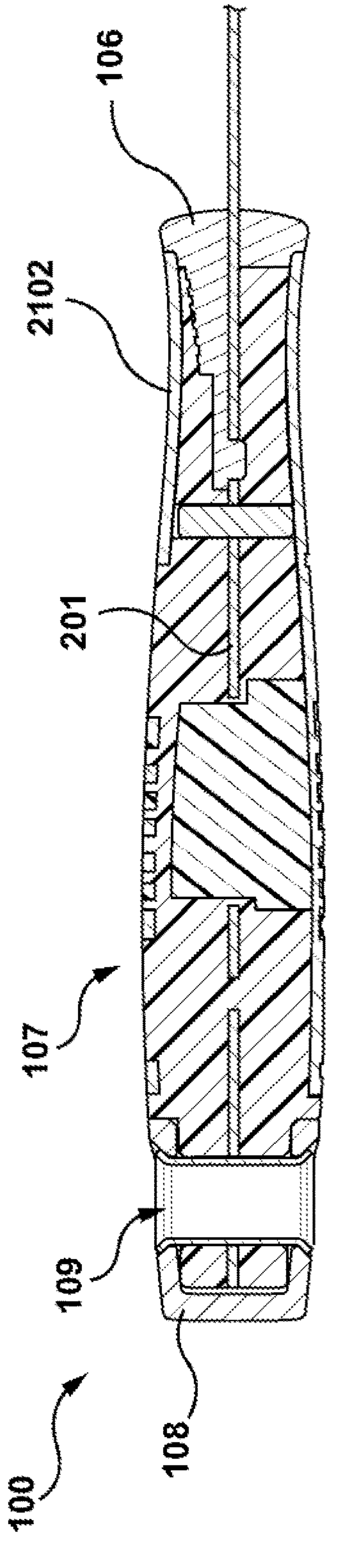
FIG. 34 is a cross-sectional view of the tool.
Figure 35:
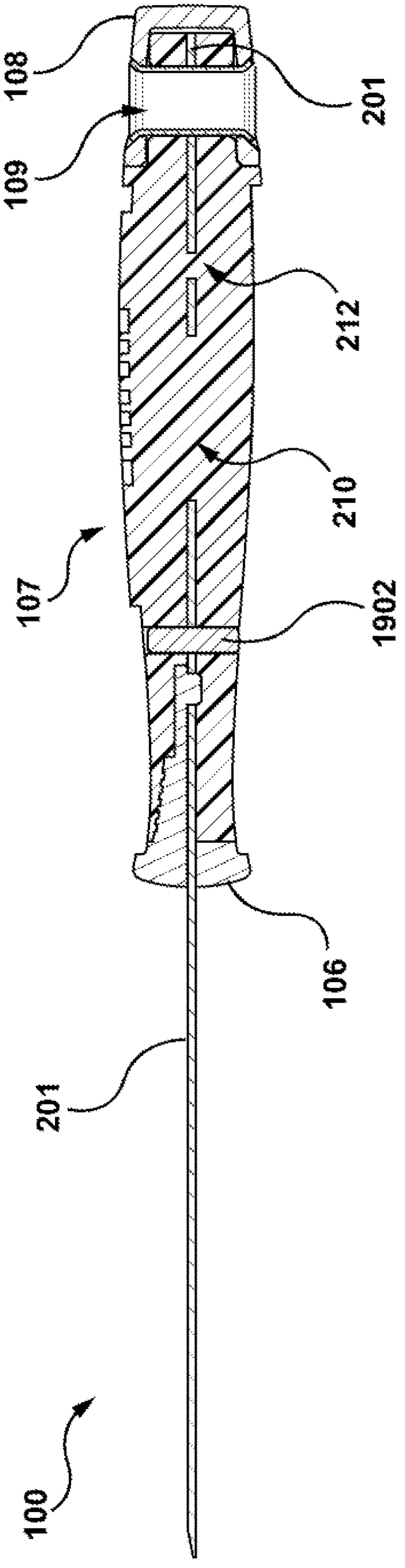
FIG. 35 is a cross-sectional view of the tool.

FIGS. 34-35 are cross-sectional views of the tool 100 illustrating the unitary plate 201, tang portion 103, blade portion 102, the body 107, the overlay 2102, hammerhead cap 108, hilt member 106, among others.

Figure 36:
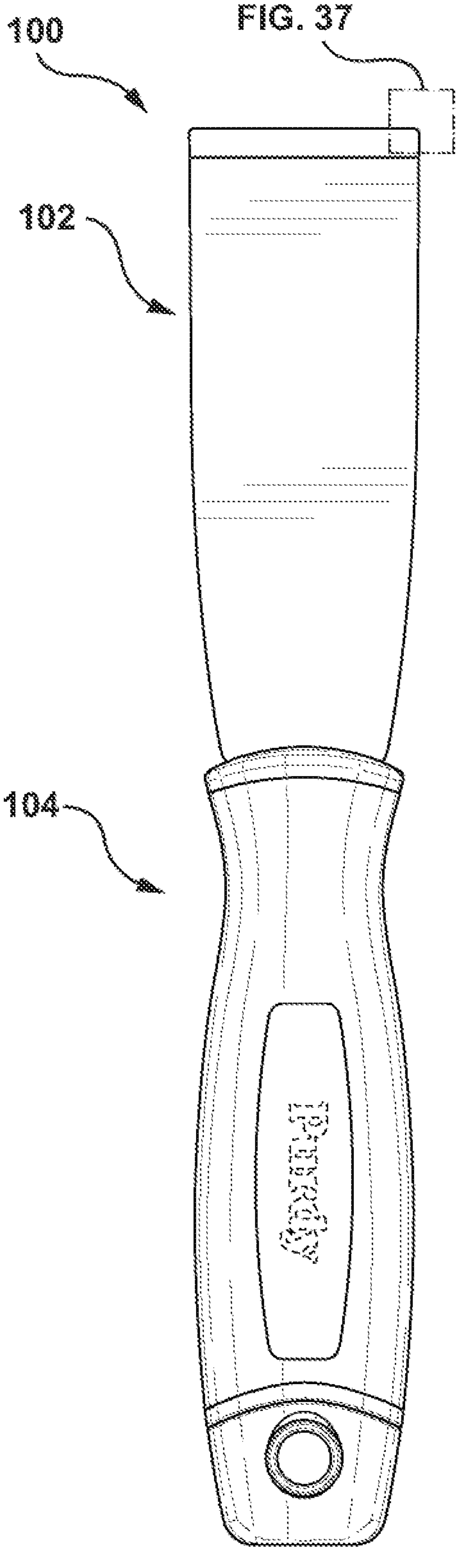
FIG. 36 is a view of a tool having an enlarged section of the blade portion.
Figure 37:
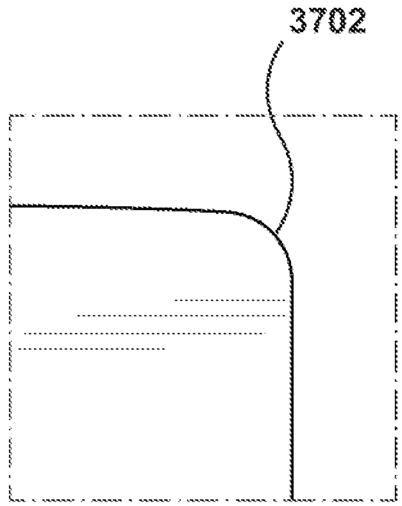
FIG. 37 is an enlarged view of the blade portion.
Figure 38:
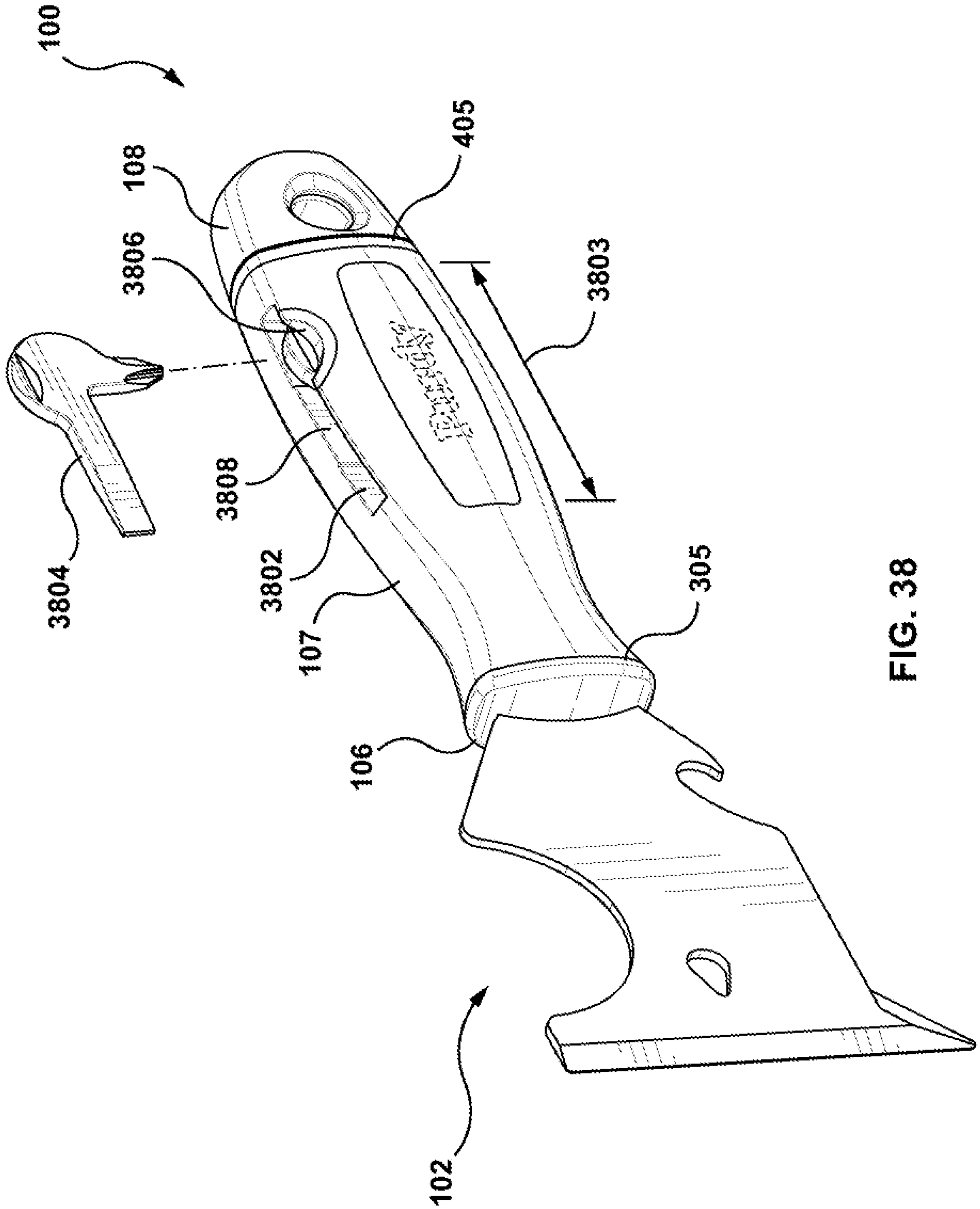
FIG. 38 illustrates a tool having a slot compartment for a second tool.
Figure 39:
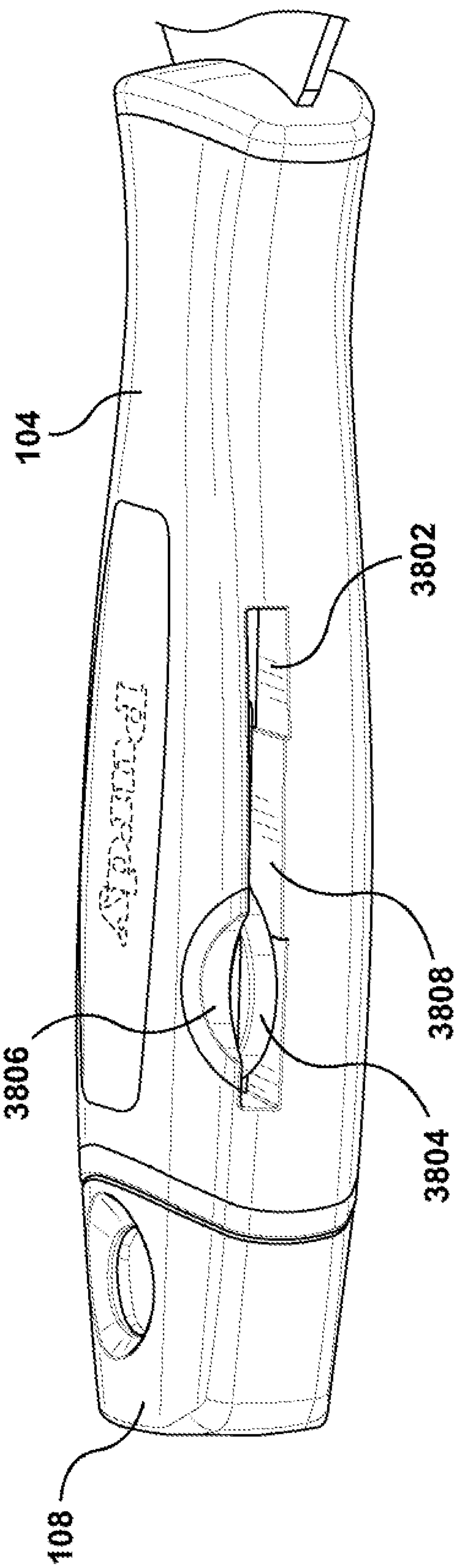
FIG. 39 illustrates a view of the tool having a slot compartment.

Turning to FIGS. 36 and 37, the tool 100 is illustrated with the blade portion 102 that includes a microbevel 3702. In an embodiment, a corner of an edge shown in FIG. 37 of the blade portion 102 can include a microbevel 3702 rather than a 90 degree angle. For example, the microbevel 3702 can remove the very sharp 90 degree corner on the outside edges of the working portion of the blade portion 102. The microbevel 3702 removes the concern of gouging, safety concerns to the user, and/or cutting drywall tape while laying plaster into the corner of a room. For example, the radius on the microbevel 3702 can be 0.020".

FIGS. 38-43 illustrate the tool 100 that includes a slot compartment 3802 for a second tool 3804. The slot compartment 3802 can be incorporated into the body 107 and a portion of the handle 104 that includes an opening into the body 107 through the overlay 2102. The slot compartment can include a length 3803 that is in a direction from the rear rim 405 to the front rim 305 and a depth that is orthogonal or approximately orthogonal to the length 3803. The slot compartment 3802 can include a curved cutout 3806 to allow access by a finger or nail to access the second tool 3804.

As depicted the slot compartment 3802 can be an "L" shape with a corresponding "L" shape second tool 3804. It is to be appreciated that the slot compartment 3802 can be have a shape and size selected by sound engineering judgment without departing from the scope of the subject innovation. By way of example and not limitation, an inside shape of the slot compartment 3802 can correspond to the second tool 3804. It is to be further appreciated that the second tool 3804 can be stored or held into the slot compartment 3802 which is located in the body 107 of the handle 104. The slot compartment 3802 can include a thickness in which the thickness corresponds to the thickness of the second tool 3804.

The slot compartment 3802 can further include a wedge member 3808 that facilitates holding the second tool 3804 in place inside the slot compartment 3802. The wedge member 3808 can have a first thickness proximate to the opening of the slot compartment 3802 and a second thickness proximate to the interior of the slot compartment 3802, wherein the second thickness is greater than the first thickness. The second thickness provides tension to the second tool 3804 to facilitate holding the second tool 3804 in position. Thus, the wedge member 3808 reduces the thickness of the slot compartment 3802 compared to the second tool 3804 in order to provide a tight fit inside.

Figure 41:
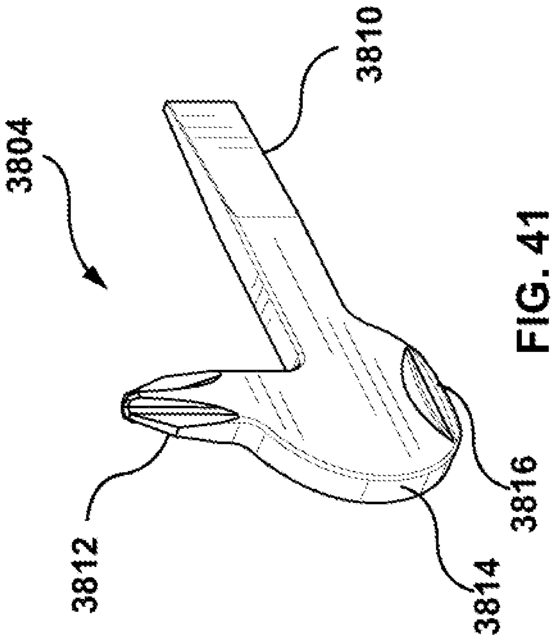
FIG. 41 illustrates a perspective view of a second tool that is stored in the slot compartment.
Figure 40:
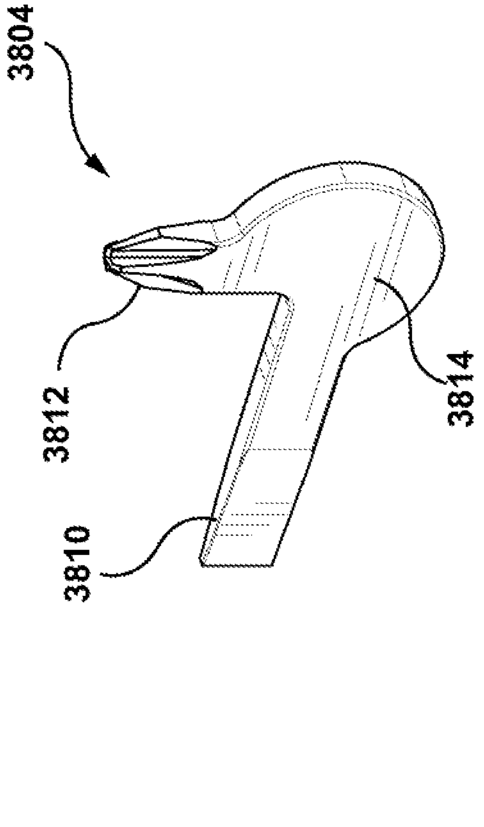
FIG. 40 illustrates a perspective view of a second tool that is stored in the slot compartment.

Turning to FIGS. 40 and 41, the second tool 3804 is illustrated in an embodiment. The second tool 3804 can include a first end 3810, a grip 3814, and a second end 3812, wherein the second tool 3804 can have a general "L" shape. The first end 3810 can extend from the grip 3814 and the second end 3812 can extend from the grip 3814 in which the first end 3810 and the second end 3812 are perpendicular to one another. In an example, the second tool 3804 can include a flat head on the first end 3810 and a phillips head on the second end 3812. The grip 3814 can include a nail groove 3816 to facilitate removal from the slot compartment 3802. It is to be appreciated that the first end 3810 and/or the second end 3812 can include various edges, tools, features, and the like. It is to be appreciated that the nail groove can be located on each side of the grip 3814. The flat head and the phillips head on the second tool 3804 are not to be limiting on the subject innovation.

Figure 42:
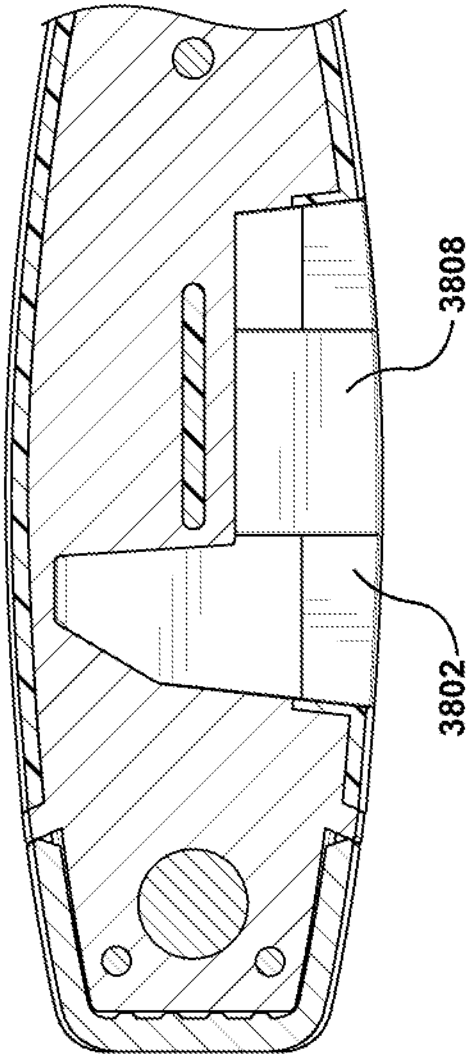
FIG. 42 illustrates a cross-sectional view of the tool having a slot compartment.
Figure 43:
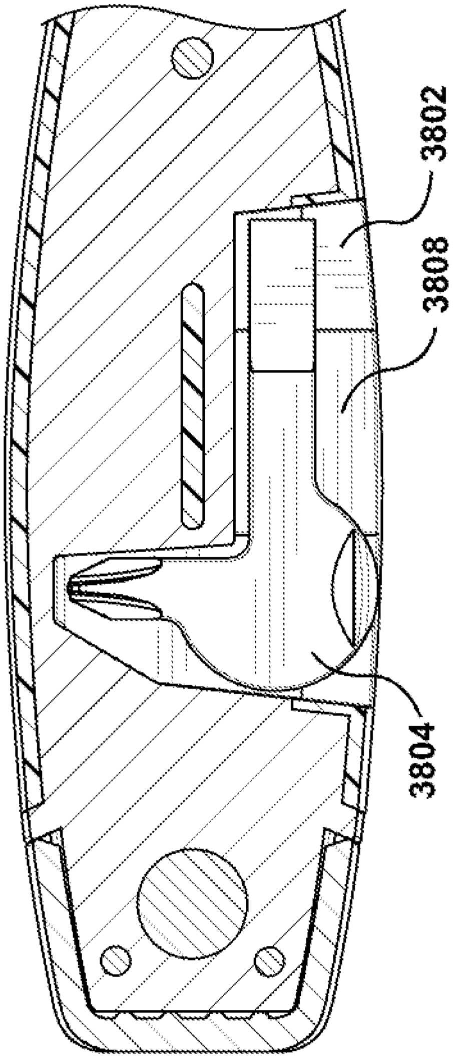
FIG. 43 illustrates a cross-sectional view of the tool having a slot compartment with a second tool therein.

FIG. 42 is a cross-sectional view of a handle of a tool 100 that shows the slot compartment 3802 without a second tool 3804 and the wedge member 3808. FIG. 43 is a cross-sectional view of a handle of a tool 100 that shows the slot compartment 3802 with the second tool 3804 and the wedge member 3808.

Figure 44:
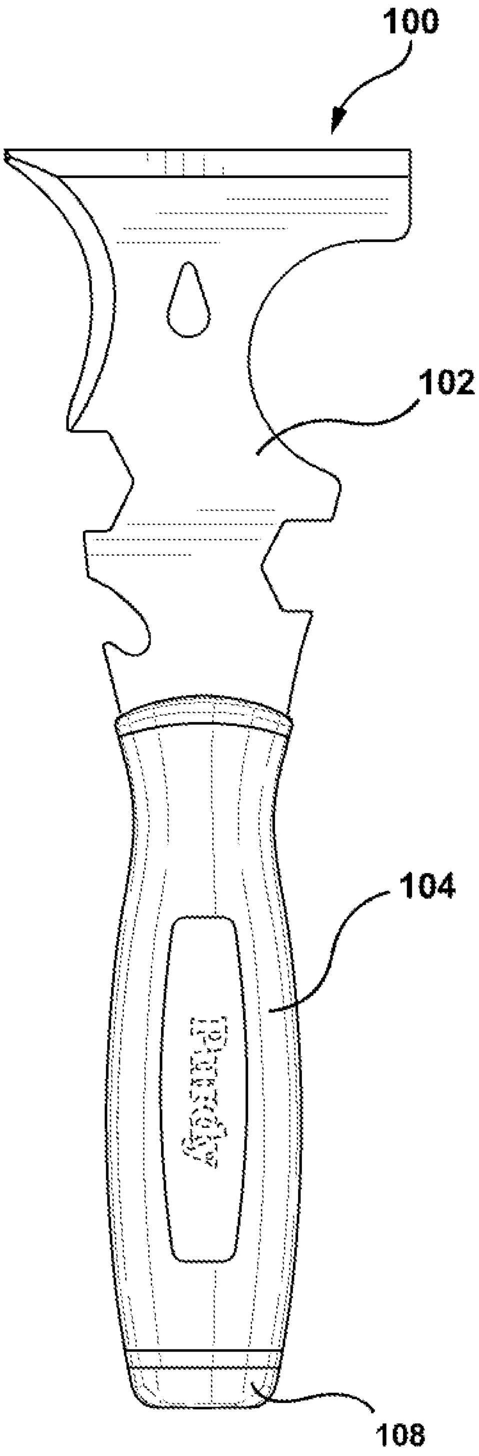
FIG. 44 illustrates an embodiment of a tool.
Figure 45:
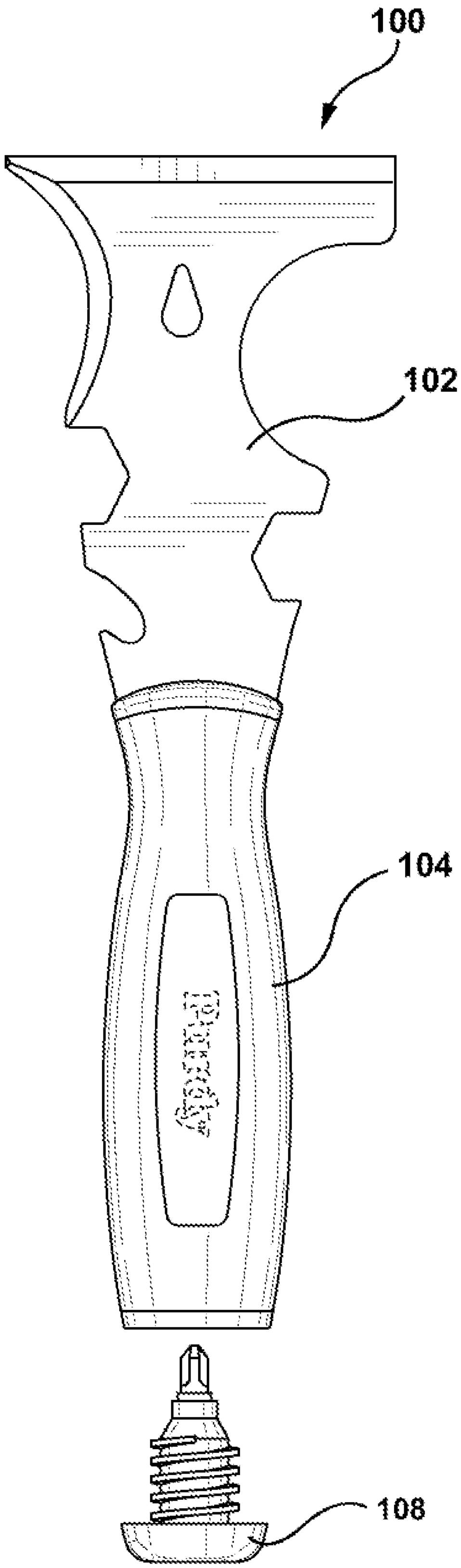
FIG. 45 illustrates an embodiment of a tool.

Turning to FIGS. 44 and 45, an embodiment of the tool 100 can include a hammerhead cap 108 on an opposite end of the edge 114. In another embodiment, the tool 100 can include a film gauge device that is retractable or removable from handle 104 or an end of the handle 104 (e.g., opposite end of the edge 114). In still another embodiment, the tool can include a hammerhead cap 108 that releasably couples the end of the tool 100 (e.g., opposite end of the edge 114), wherein the hammerhead cap 108 can store or hold a second tool (e.g., screwdriver, a bit, among others). In another example, the hammerhead cap 108 can be secured over an end of a handle 104 of the tool 100, wherein the hammerhead cap 108 is secured to the end of the handle 104 with a rivet. The tool 100 can further include a can opener and the end opposite the edge 114 or on the blade portion 102.

In an embodiment, the blade portion 102 can include a thickness and a length that is exposed from the handle 104 (e.g., exposed from the hilt member 106 attached or incorporated into the body 107 that forms the handle 104). In an example, the thickness of the blade portion 102 can vary between the length from the front end 110 to the rear end 112. For example, the length of the blade portion 102 can include one or more sections and each section can have a respective length and/or thickness. For example, the thickness of the blade portion 102 can decrease from the rear end of 112 to the front end 110 of the blade portion.

In a particular embodiment, the blade portion 102 can have a portion that is exposed from the handle 104 and/or the hilt member 106 and such portion can be divided into three (3) sections such as a top section, a middle section, and a bottom section. In this embodiment, the top section can have a first thickness, the middle section can have a second thickness, and the bottom section can have a third thickness. By way of example and not limitation, the first thickness and the third thickness can be greater than the second thickness. In another embodiment, the first thickness is equal to the third thickness, and the second thickness is less than the first thickness and the third thickness. It is to be appreciated that the portion of the blade portion 102 that is exposed from the hilt member 106 and/or the handle 104 can include one or more sections, wherein each section can include a respective thickness.

In another embodiment, a slot or compartment can be incorporated into the handle 104, wherein the slot or compartment can store a tool, a portion of a tool, or an object. For example, the tool or object can be, but is not limited to, a screwdriver (e.g., flathead, phillips head, etc.), a socket, a wrench, a socket, a plyer, a bottle opener, a can opener, a knife, a blade, a nail remover, a hex wrench, an alien wrench, a needle, a tape dispenser, a pencil, a pen, a writing device, a laser pointer, a level, a wireless headset, a battery, a tape measure, among others.

In an embodiment, the tool can include the handle with a slot. The slot can store or stow one or more screw driving tools (Standard and Phillips heads). For example, the slot or opening for the stowed tool can have slight chamfers to minimize a possible cut hazard to the end user. The stowed tool can be a "driver key" (e.g., thumb tab with the two screw driver bits) that can be removed and replaced.

With reference to the drawings, like reference numerals designate identical or corresponding parts throughout the several views. However, the inclusion of like elements in different views does not mean a given embodiment necessarily includes such elements or that all embodiments of the invention include such elements.

The aforementioned elements (e.g., tool 100, blade portion 102, tang portion 103, body 107, hilt member 106, handle 104, among others), and the like have been described with respect to interaction between several components and/or elements. It should be appreciated that such elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A tool, comprising:

a plate having a first end, a second end opposite thereto, a length between the first end and the second end, and a thickness, the plate extending along a plane from the first end to the second end; and a body coupled to a portion of the plate, wherein the body includes a front face, a rear face opposite the front face and generally parallel to the plane, a first side extending between the front face and the rear face, and a second side opposite the first side;

wherein the body further comprises a slot compartment defined at least partially by a front wall arranged parallel to the plane and a rear wall arranged parallel to the plane and spaced apart from the front wall by a slot thickness, wherein the slot compartment is configured to receive a second tool and at least partially conceal the second tool within the body between the front face and the rear face, and the slot compartment has an opening in the first side of the body, a length extending in the direction from the first end to the second end, and a depth extending from the first side towards the second side;

wherein the slot compartment further comprises a wedge member that includes a planar surface extending along a portion of one of the front wall or the rear wall of the slot compartment, wherein the wedge member has a first thickness proximate to the opening of the slot compartment and a second thickness proximate to an interior of the slot compartment, wherein the second thickness is greater than the first thickness, and the wedge member reduces the slot thickness between the front wall and rear wall of the slot compartment, and the wedge member is configured to facilitate maintaining a position of the second tool when stored within the slot compartment; and wherein the body further comprises a thumb notch in the front face, the thumb notch being a cutout beginning at a perimeter of the opening along the length of the slot compartment in the first side, and extending into the front face and the front wall along the depth of the slot compartment.

2. The tool of claim 1, wherein the plate comprises a blade portion and a tang portion.

3. The tool of claim 2, wherein the body is formed to surround the tang portion.

4. The tool of claim 2, wherein the tang portion includes one or more holes.

5. The tool of claim 4, wherein the body is integrated to the tang portion through at least one of the one or more holes.

6. The tool of claim 4, further comprising a pin inserted through one of the one or more holes.

7. The tool of claim 2, further comprising a hammerhead cap coupled to an end of the body that includes a rivet inserted through a rivet hole in the rear end of the tang portion and a hole in the body to fasten the hammerhead cap to the body.

8. The tool of claim 7, wherein the hammerhead cap includes one or more teeth on an inside of the hammerhead cap.

9. The tool of claim 2, wherein the blade portion further includes an edge.

10. The tool of claim 1, further comprising an overlay on the body.

11. A tool, comprising:

a unitary plate having a first end, a second end opposite thereto, a length between the first end and the second end, and a thickness, the first end forming a front end of a blade portion and the second end forming a rear end of a tang portion, the unitary plate extending along a plane from the first end to the second end; and a body formed on the tang portion, wherein the body includes a front face, a rear face opposite the front face and generally parallel to the plane, a first side, and a second side opposite the first side;

wherein the body further comprises a slot compartment at least partially defined by a front wall arranged parallel to the plane and a rear wall arranged parallel to the plane and spaced apart from the front wall by a slot thickness, the slot compartment having an opening in the first side of the body, wherein the slot compartment is configured to receive a second tool and at least partially conceal the second tool within the body between the front face and the rear face, and the slot compartment has a length extending in the direction from the first end to the second end and a depth that is orthogonal to the length, the depth extending from the first side towards the second side, wherein the body further comprises a thumb notch in the front face, the thumb notch being a curved cutout beginning at a perimeter of the opening along the length of the slot compartment; and wherein the slot compartment further comprises a wedge member that includes a planar surface extending along a portion of one of the front wall or the rear wall of the slot compartment, wherein the wedge member has a first thickness proximate to the opening of the slot compartment and a second thickness proximate to an interior of the slot compartment, wherein the second thickness is greater than the first thickness, and the wedge member is configured to facilitate maintaining a position of the second tool when stored within the slot compartment.

12. The tool of claim 11, further comprising:

a hammerhead cap coupled to an end of the body that includes a rivet inserted through a rivet hole in the tang portion and a hole in the body to fasten the hammerhead cap to the body; and the hammerhead cap includes one or more teeth on an inside of the hammerhead cap.

13. A tool, comprising:

a plate having a first end, a second end opposite thereto, a length between the first end and the second end, and a thickness, the first end forming a front end of a blade portion and the second end forming a rear end of a tang portion, wherein the plate extends along a plane from the first end to the second end;

a body formed to surround the tang portion, wherein the body includes a front face, a rear face opposite the front face and generally parallel to the plane, a first side extending between the front face and the rear face, and a second side opposite the first side;

wherein the body further comprises a slot compartment defined at least partially by a front wall arranged parallel to the first plane and a rear wall arranged parallel to the first plane and spaced apart from the front wall by a slot thickness, wherein the slot compartment includes an opening in the first side of the body, and wherein the slot compartment is configured to receive a second tool and at least partially conceal the second tool within the body between the front face and the rear face, and the slot compartment has a length extending in the direction from the first end to the second end and a depth that is orthogonal to the length, wherein the depth extends into the body from the first side towards the second side;

wherein the slot compartment further comprises a wedge member that includes a planar surface extending along a portion of one of the front wall or the rear wall of the slot compartment, wherein the wedge member has a first thickness proximate to the opening of the slot compartment and a second thickness proximate to an interior of the slot compartment, wherein the second thickness is greater than the first thickness, and the wedge member reduces the slot thickness between the front wall and rear wall of the slot compartment, and the wedge member is configured to facilitate maintaining a position of the second tool when stored within the slot compartment; and wherein the body further comprises a thumb notch, the thumb notch being a curved cutout beginning at a perimeter of the opening along the length of the slot compartment in the first side, and extending into the front face and the front wall along the depth of the slot compartment.

14. The tool of claim 13, further comprising an overlay on the body.

15. The tool of claim 13, wherein the planar surface of the wedge member extends along an entirety of the depth of a portion of the slot compartment.

16. The tool of claim 13, wherein the tang portion includes one or more holes.

* * * * *